(12) United States Patent
Labadie et al.

(10) Patent No.: US 10,724,483 B2
(45) Date of Patent: Jul. 28, 2020

(54) NVH SOUNDTUBE HAVING INTEGRATED HYDROCARBON ADSORPTION AND AIR FILTRATION DEVICE TO CONTROL EVAPORATIVE EMISSIONS

(71) Applicant: Ford Global Technologies, LLC, Dearborn, MI (US)

(72) Inventors: Ryan Labadie, Temperance, MI (US); David S. Moyer, Sterling Heights, MI (US); John Emley, Canton, MI (US); Jeffrey Morton, Royal Oak, MI (US); Scott M. Rollins, Canton, MI (US); Robert Joseph Mohan, Canton, MI (US); Roger Joseph Khami, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 15/689,549

(22) Filed: Aug. 29, 2017

(65) Prior Publication Data

US 2019/0063379 A1 Feb. 28, 2019

(51) Int. Cl.
*F02M 35/02* (2006.01)
*B01D 53/04* (2006.01)
*B01D 46/00* (2006.01)
*B01D 46/10* (2006.01)
*F02M 35/024* (2006.01)

(52) U.S. Cl.
CPC ..... *F02M 35/0218* (2013.01); *B01D 46/0036* (2013.01); *B01D 46/10* (2013.01); *B01D 53/0407* (2013.01); *B01D 53/0415* (2013.01); *F02M 35/02408* (2013.01); *B01D 2253/102* (2013.01); *B01D 2253/108* (2013.01);
(Continued)

(58) Field of Classification Search
None
See application file for complete search history.

(56) References Cited

U.S. PATENT DOCUMENTS 4,089,663 A 5/1978 Kulig et al.
4,758,460 A * 7/1988 Spicer .................. B01D 39/14
427/244
(Continued)

FOREIGN PATENT DOCUMENTS

DE 202007003941 7/2008
WO 2013142579 9/2013

*Primary Examiner* — Tam M Nguyen

(57) ABSTRACT

An integrated hydrocarbon trap and air filter in the soundtube of a vehicle for use in conjunction with the engine's air intake system is disclosed. The trap and air filter comprises a housing body having first and second ends. The housing includes hydrocarbon-adsorbing media and air filter media. The hydrocarbon-adsorbing and air filter trap are incorporated into a soundtube. A first soundtube portion connects the housing to the engine's air intake system while a second soundtube is open to ambient and connects the housing to a vehicle body structure such as a fender. Selection of the body diameter, thickness, and length, the dimensions and type of both air filter media and hydrocarbon-adsorbing media and position of the air filter media, NVH media, and space relative to the trap media and location of the integrated hydrocarbon trap and air filter along the soundtube provide superior tunability and adaptability.

20 Claims, 25 Drawing Sheets

(52) U.S. Cl.
CPC .... *B01D 2257/702* (2013.01); *B01D 2258/06* (2013.01); *B01D 2259/4566* (2013.01)

(56) References Cited

U.S. PATENT DOCUMENTS

| | | | | |
|---|---|---|---|---|
| 5,288,298 A * | 2/1994 | Aston | | B01D 46/001 55/485 |
| 5,437,701 A * | 8/1995 | Townsley | | B01D 39/1676 55/486 |
| 5,962,820 A | 10/1999 | LePoutre | | |
| 6,009,705 A | 1/2000 | Arnott et al. | | |
| 6,136,055 A * | 10/2000 | Stanek | | B01D 46/001 55/357 |
| 6,817,345 B2 * | 11/2004 | Lawrence | | B01D 53/02 123/518 |
| 6,878,057 B1 * | 4/2005 | Calloura | | A61L 9/12 454/299 |
| 7,150,260 B2 | 12/2006 | Arevalo et al. | | |
| 7,207,310 B2 | 4/2007 | Shaw et al. | | |
| 2004/0105070 A1 * | 6/2004 | Hockaday | | A61F 9/028 351/156 |
| 2005/0284692 A1 | 12/2005 | McWilliam et al. | | |
| 2010/0065030 A1 * | 3/2010 | Bellis | | B01D 53/0415 123/574 |
| 2014/0110030 A1 * | 4/2014 | Krempel | | B60C 23/12 152/450 |
| 2014/0209051 A1 * | 7/2014 | Jackson | | F02M 35/0218 123/184.53 |
| 2015/0219046 A1 * | 8/2015 | Weckerle | | F02M 25/0854 96/147 |
| 2016/0290292 A1 * | 10/2016 | Fedak | | F02M 35/0218 |
| 2016/0290293 A1 * | 10/2016 | Fedak | | F02M 35/0218 |
| 2017/0234246 A1 * | 8/2017 | Dudar | | F02M 25/0836 701/22 |
| 2018/0171948 A1 * | 6/2018 | McClelland | | F02M 35/10281 |
| 2018/0340497 A1 * | 11/2018 | Arnold | | F02M 35/10255 |

* cited by examiner

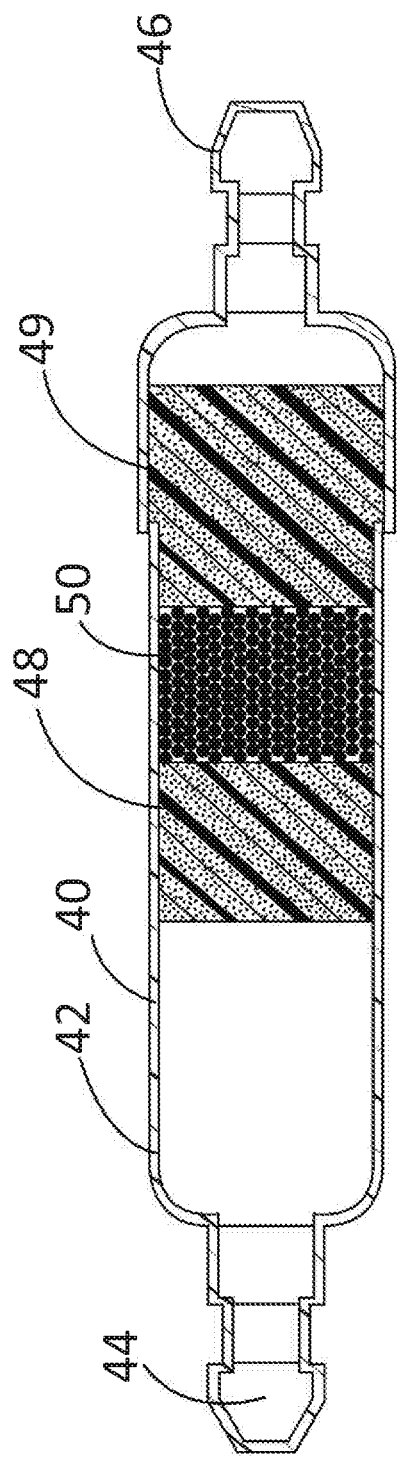
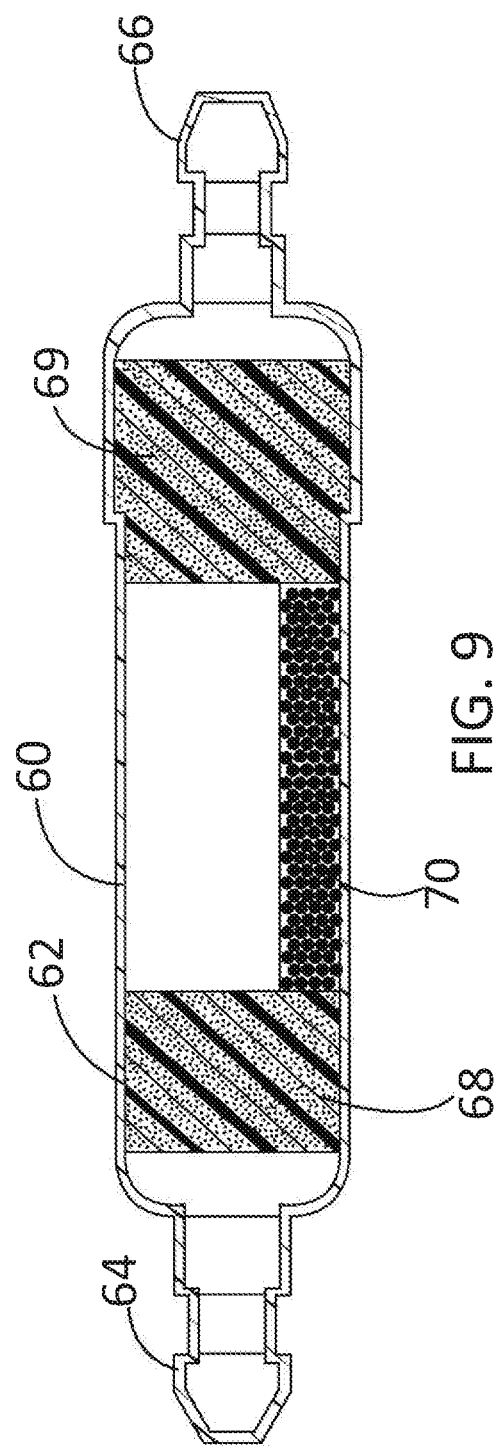
FIG. 8
FIG. 9

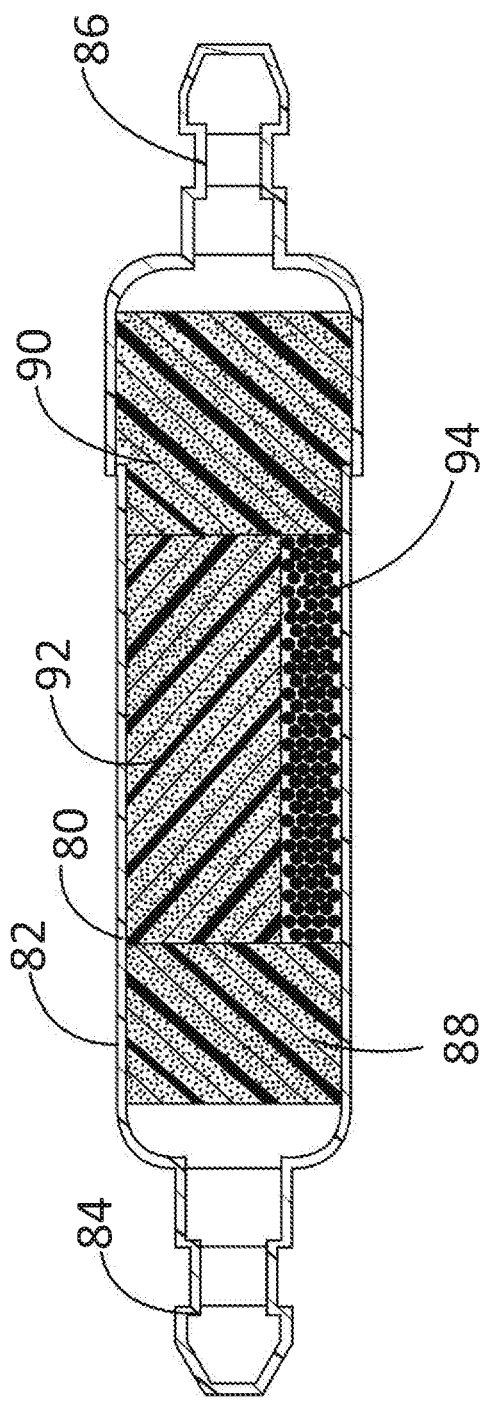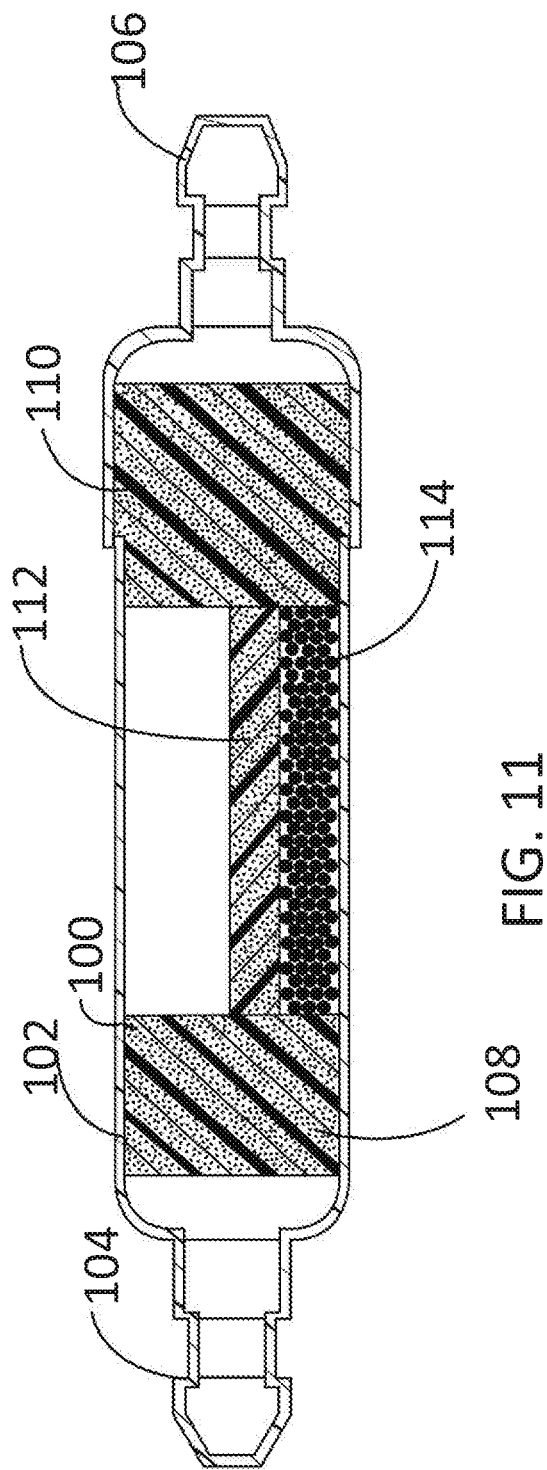

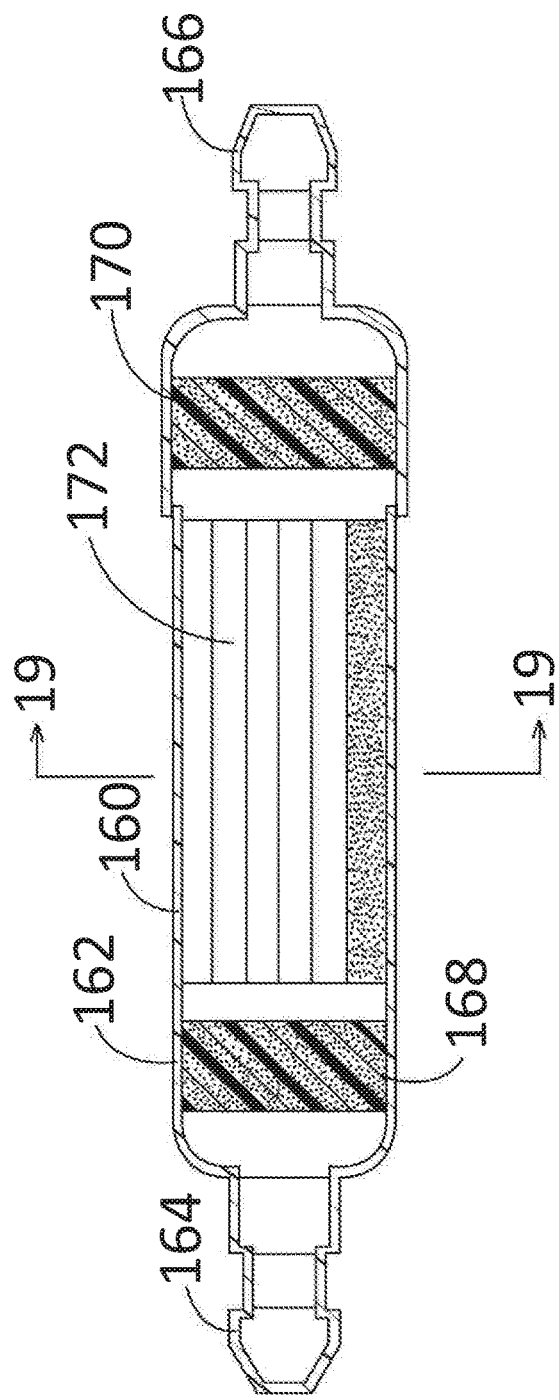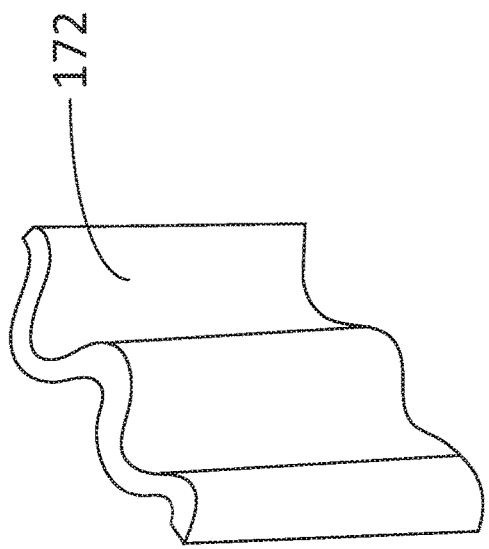
FIG. 17
FIG. 18

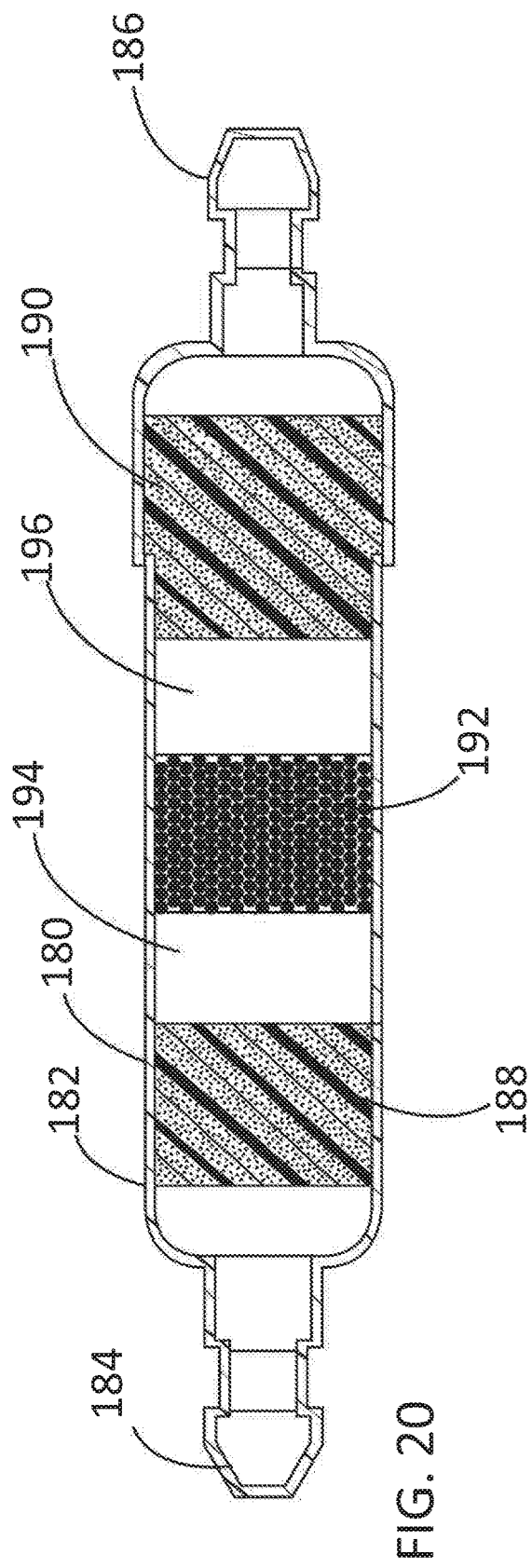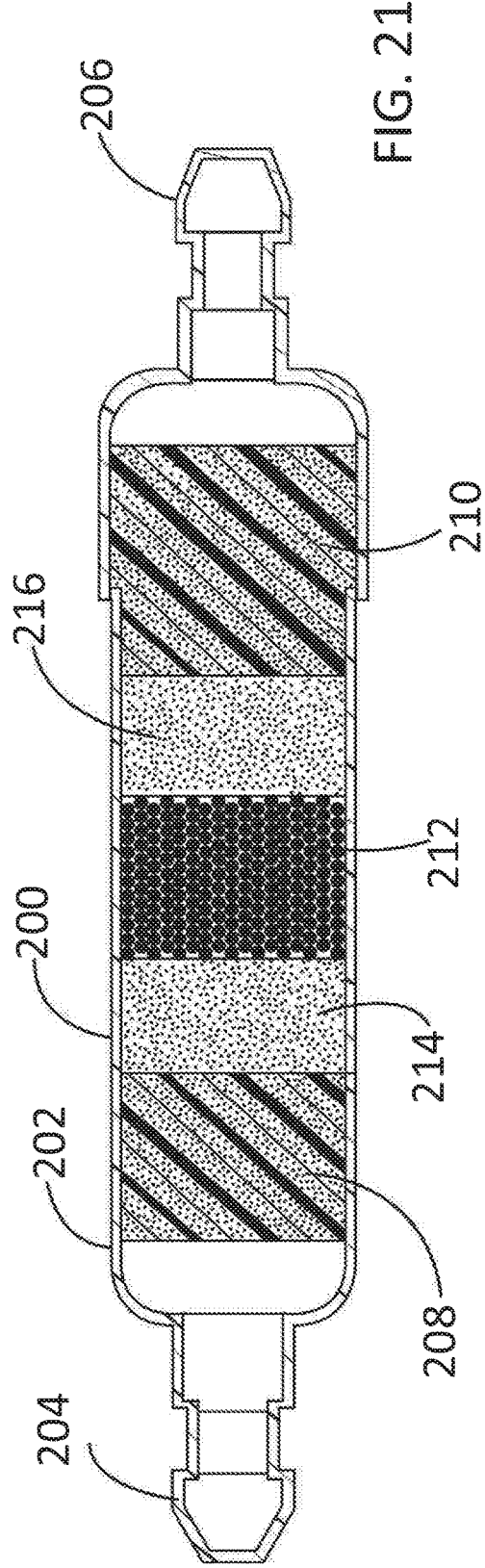

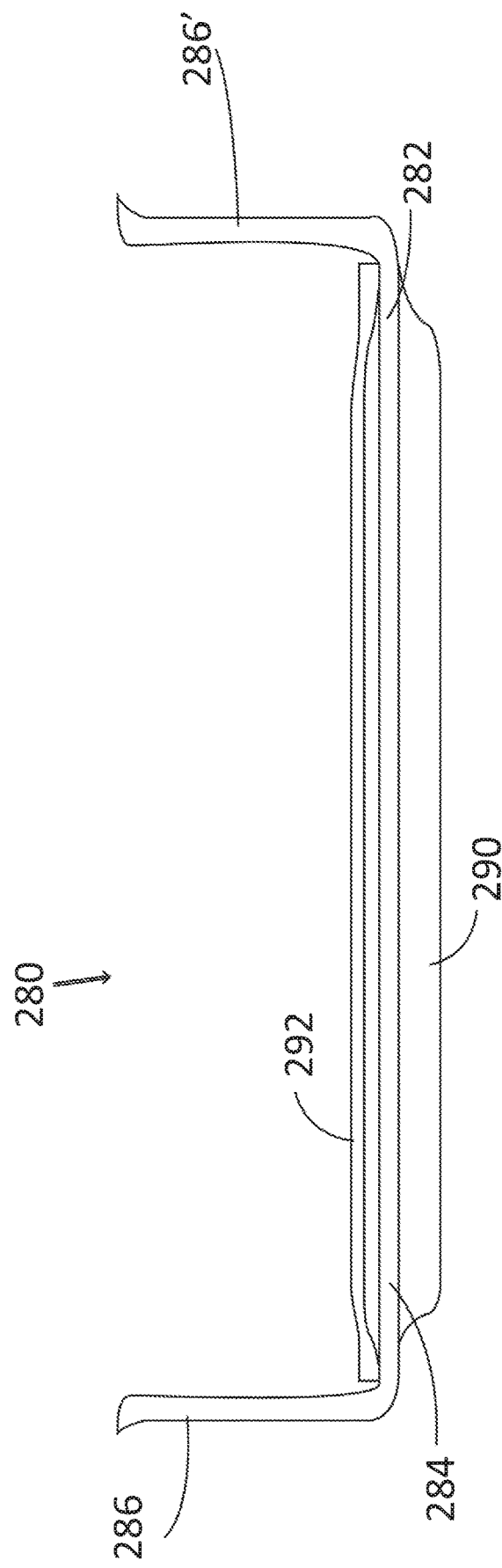
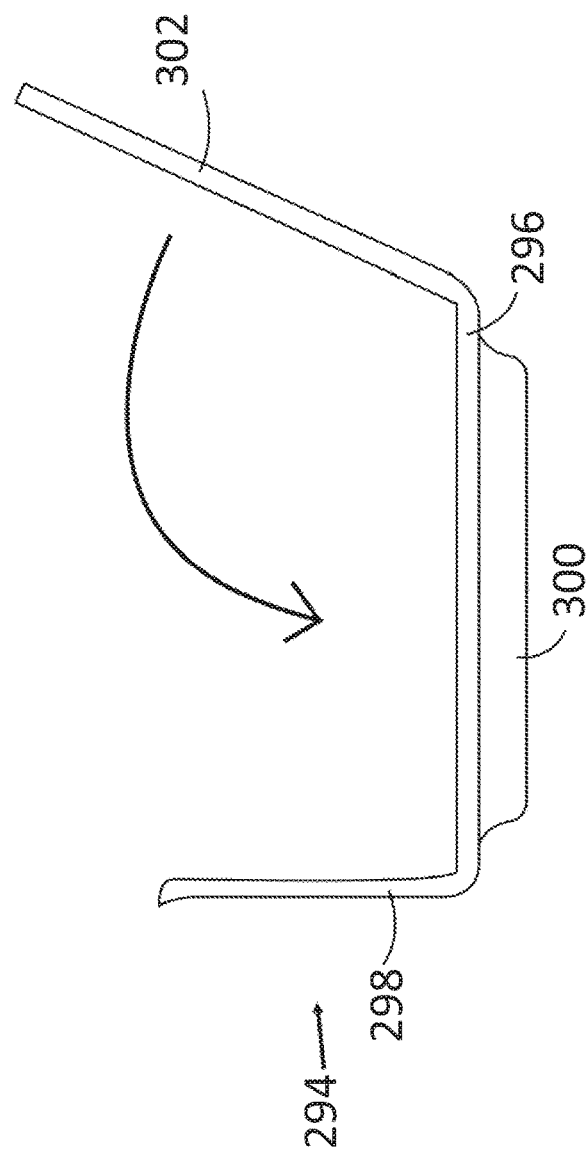

NVH SOUNDTUBE HAVING INTEGRATED HYDROCARBON ADSORPTION AND AIR FILTRATION DEVICE TO CONTROL EVAPORATIVE EMISSIONS

TECHNICAL FIELD

The disclosed inventive concept relates generally to hydrocarbon-adsorption devices and acoustic tuning in an automobile. More particularly, the disclosed inventive concept relates to a hydrocarbon trap fitted to an in-line soundtube positioned between the air cleaner clean air outlet duct and vehicle body structure. The hydrocarbon trap includes a body housing air filter media to filter incoming air and hydrocarbon trap media to capture evaporative emissions. The hydrocarbon trap, operating in conjunction with the in-line soundtube, functions as an air flow path, an evaporative emissions path and a sound path. The hydrocarbon trap captures evaporative emissions during engine off soaks. During engine on the hydrocarbons are desorbed from the hydrocarbon trap and burned during engine combustion.

BACKGROUND OF THE INVENTION

Automobile designers are today challenged by a broad range of requirements externally imposed by customer demands at one extreme and by government regulation at the other. One such customer demand is for the reduction of overall vehicle noise, vibration and harshness (NVH). Some vehicle owners prefer a quiet vehicle riding experience both within the vehicle cabin and under the engine hood. Other vehicle owners, particularly those who prefer sports cars and audible engine noise, do not want to entirely eliminate the resonance of a well-tuned engine and find that such engine noise actually enhances the driving experience. In response to the interests of the sports car enthusiast, the assignee of the instant patent application makes available induction soundtubes between the engine's air intake and the vehicle cabin to thereby provide the vehicle occupant and particularly the driver with some measure of vehicle feedback, particularly upon acceleration.

The engine-to-cabin induction soundtube is one example of how vehicle designers are enhancing the driving experience. Another example is the provision of an induction clean air tube between the engine's air induction system and the front fender of the vehicle where the tube acts as a fresh air inlet. However, adjusting vehicle engine noise to the satisfaction of the customer is not merely a matter of transmitting sound from the engine to another point on the vehicle. Instead, the soundtube arrangement must be acoustically tuned for specific engine frequencies. This is a task that introduces other challenges to vehicle designers given that the accelerating engine generates sound ranges through a number of harmonic orders with only a couple of orders representing desirable sounds.

Correct acoustical tuning of the engine air induction clean air tube is only one challenge faced by the vehicle manufacturer. Another challenge is to meet government air evaporative emission quality standards related to the release of hydrocarbons to the atmosphere. The engine is one source of vehicle evaporative emissions. These vehicle evaporative emission regulations require the control of polluting substances (primarily hydrocarbons) from the vehicle. As an example, fuel that is sprayed into the intake manifold by the fuel injector typically remains on the walls in the intake manifold and the intake valves after engine shut down, thereby allowing fuel vapor to flow out of the air induction system. The evaporative emissions in the form of escaping unburned fuel may exceed government mandated requirements for such emissions.

Government regulations have been expanded in recent years to regulate the hydrocarbon emissions from the vehicle even when the vehicle is unused and the engine is off. During such engine off soaks, the evaporative hydrocarbons may be emitted by the engine through the air induction system. These emissions are leaked from the vehicle from many sources including the air intake system. This is an expansion from prior rules in which only emissions from the fuel tank were captured typically using carbon-filled canisters. Government requirements now regulate the total amount of hydrocarbons any vehicle is permitted to emit to the atmosphere at all times. These captured substances need to be retained within the air induction system until the powertrain is again used when the retention system will purge and burn the hydrocarbons during engine combustion.

When the air induction system is a significant contributor to overall vehicle hydrocarbon levels, a hydrocarbon trap must be utilized to capture hydrocarbons during engine off and to release and burn hydrocarbons during normal engine operation. In addition, the engine air induction clean air tube pulls atmospheric air from the environment into the engine, thus potentially introducing particulates directly into the air induction system.

A vehicle application was encountered that required an opening into the vehicle fender cavity. This opening "transmitted" the tuned sound to the vehicle occupant but allows air flow into the engine air induction system. The additional air flow path required filtration of the air to the engine as well as a hydrocarbon control device.

SUMMARY OF THE INVENTION

The disclosed inventive concept provides an integrated hydrocarbon trap and an air filter in a soundtube of an automotive vehicle for use in conjunction with the engine's air intake system. The integrated hydrocarbon trap and air filter comprises a trap having a body with a first end and a second end. The trap includes hydrocarbon-adsorbing media and air filter media. The hydrocarbon trap and air filter is incorporated into a soundtube. A first portion of the soundtube is a conduit connecting the hydrocarbon trap and air filter assembly to the engine's air intake system while a second portion of the soundtube conduit connects the trap to a body structure of the vehicle such as a fender. This soundtube portion is attached to a fender cavity, a dash panel or a bulkhead or the like and is open to ambient.

The air filter media may be formed from any of a variety of materials including, without limitation, open cell reticulated foam. The hydrocarbon-adsorbing media is preferably although not absolutely selected from the group consisting of activated charcoal, activated carbon pellets, activated carbon impregnated paper, activated carbon-impregnated non-woven polyester, activated carbon-impregnated foam and zeolite.

The disclosed inventive concept provides additional advantages over known technology. First, the integrated hydrocarbon trap and air filter in combination with a soundtube as set forth in its various embodiments offers both a simplified construction as well as a lower weight compared with the total weights of each of these units when taken individually. Second, the integrated hydrocarbon trap and air filter of the disclosed inventive concept provides extreme tunability based on variations of, for example, the soundtube length, diameter, and thickness, the dimensions and type of media selected for air filtering, as well as the dimensions and type of material selected for trapping hydrocarbons and positions of the air filter media, NVH media, and space relative to the hydrocarbon trap media. An additional tunable feature of the disclosed inventive concept is the selected location of the integrated hydrocarbon trap and air filter along the soundtube.

While the hydrocarbon-adsorbing material may be provided in pellet form, an alternate embodiment of the disclosed inventive concept provides a layer of hydrocarbon-adsorbing material in sheet form. When such a sheet is adapted for use, the sheet may be positioned along the inner wall of the trap body between the first and second air filter parts. A variation of this embodiment includes the provision of a folded or pleated sheet of hydrocarbon-removing material positioned between the first and second air filter parts.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 8 is a sectional view of an embodiment of an integrated HC trap and air filter according to the disclosed inventive concept taken along the long axis;

FIG. 9 is a sectional view of another embodiment of an integrated HC trap and air filter according to the disclosed inventive concept taken along the long axis;

FIG. 10 is a sectional view of another embodiment of an integrated HC trap and air filter according to the disclosed inventive concept taken along the long axis;

FIG. 11 is a sectional view of another embodiment of an integrated HC trap and air filter according to the disclosed inventive concept taken along the long axis;

FIG. 17 is a sectional view of another embodiment of an integrated HC trap and air filter according to the disclosed inventive concept taken along the long axis;

FIG. 18 is a perspective view of the pleated insert incorporated into the integrated HC trap and air filter of FIG. 17;

FIG. 20 is a sectional view of an integrated HC trap and air filter according to an additional embodiment of the disclosed inventive concept; and FIG. 21 is a sectional view of an integrated HC trap and air filter according to an additional embodiment of the disclosed inventive concept.

FIG. 30 is a side view of the integrated HC trap and air filter of FIG. 29;

FIG. 31 is a side view of a variation of the integrated HC trap and air filter of FIG. 29 in which the cover layer is integrated with the base;

DETAILED DESCRIPTION OF THE PREFERRED EMBODIMENT

Figure 1:
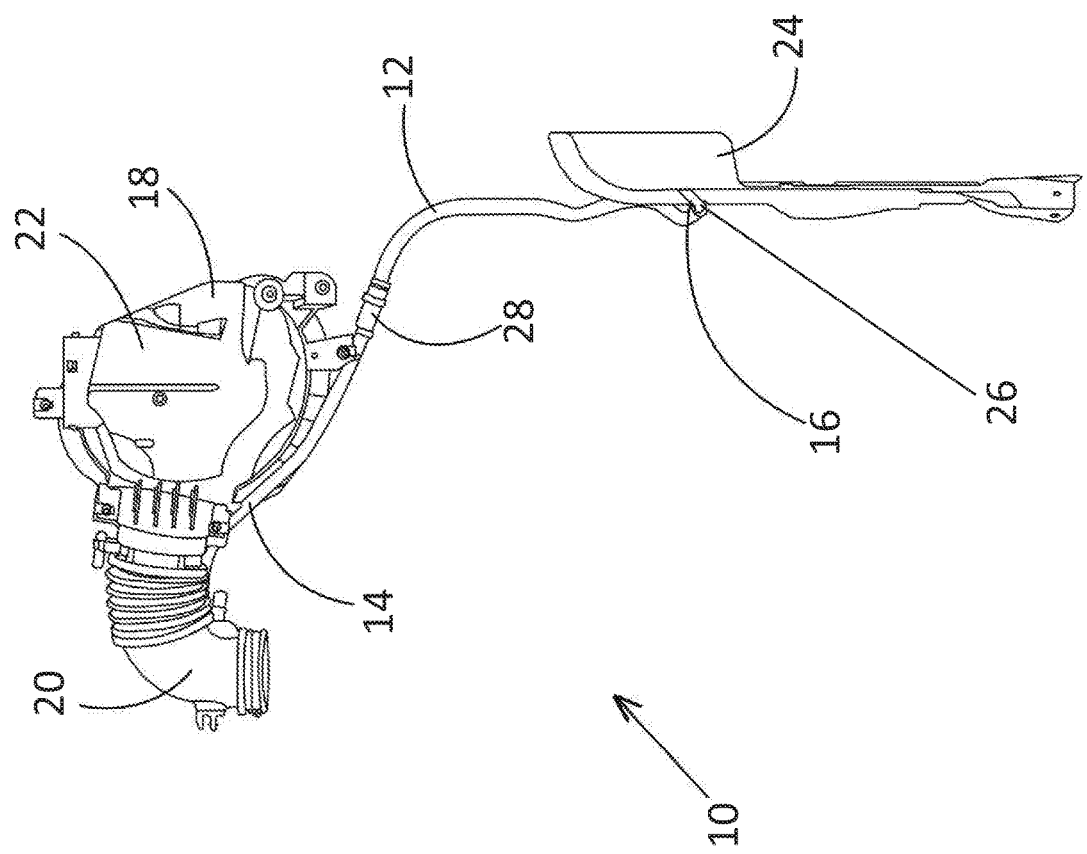
FIG. 1 is a top schematic view of soundtube system having an integrated HC trap and air filter according to the disclosed inventive concept positioned between the air cleaner box and the fender cavity fresh air inlet.
Figure 2:
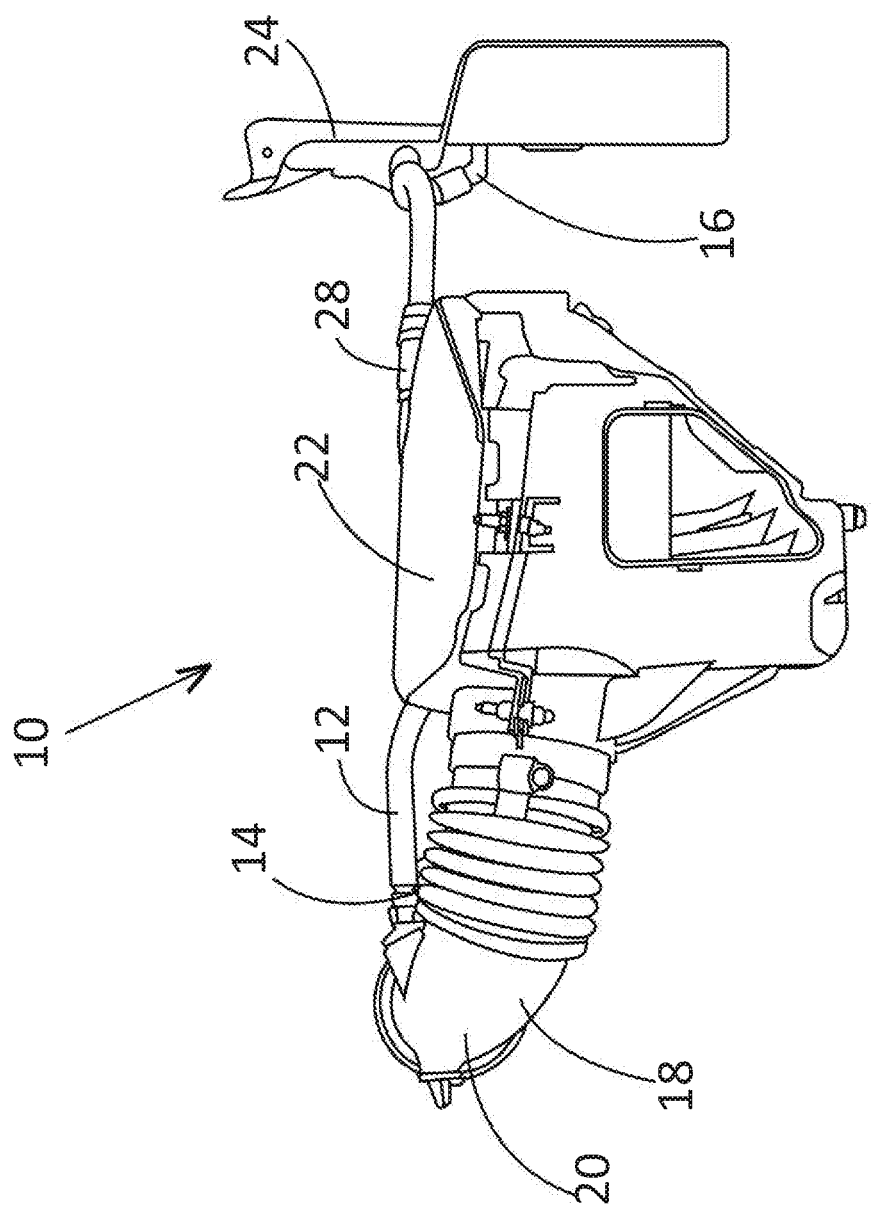
FIG. 2 is a first end schematic view of the soundtube system of FIG. 1.
Figure 3:
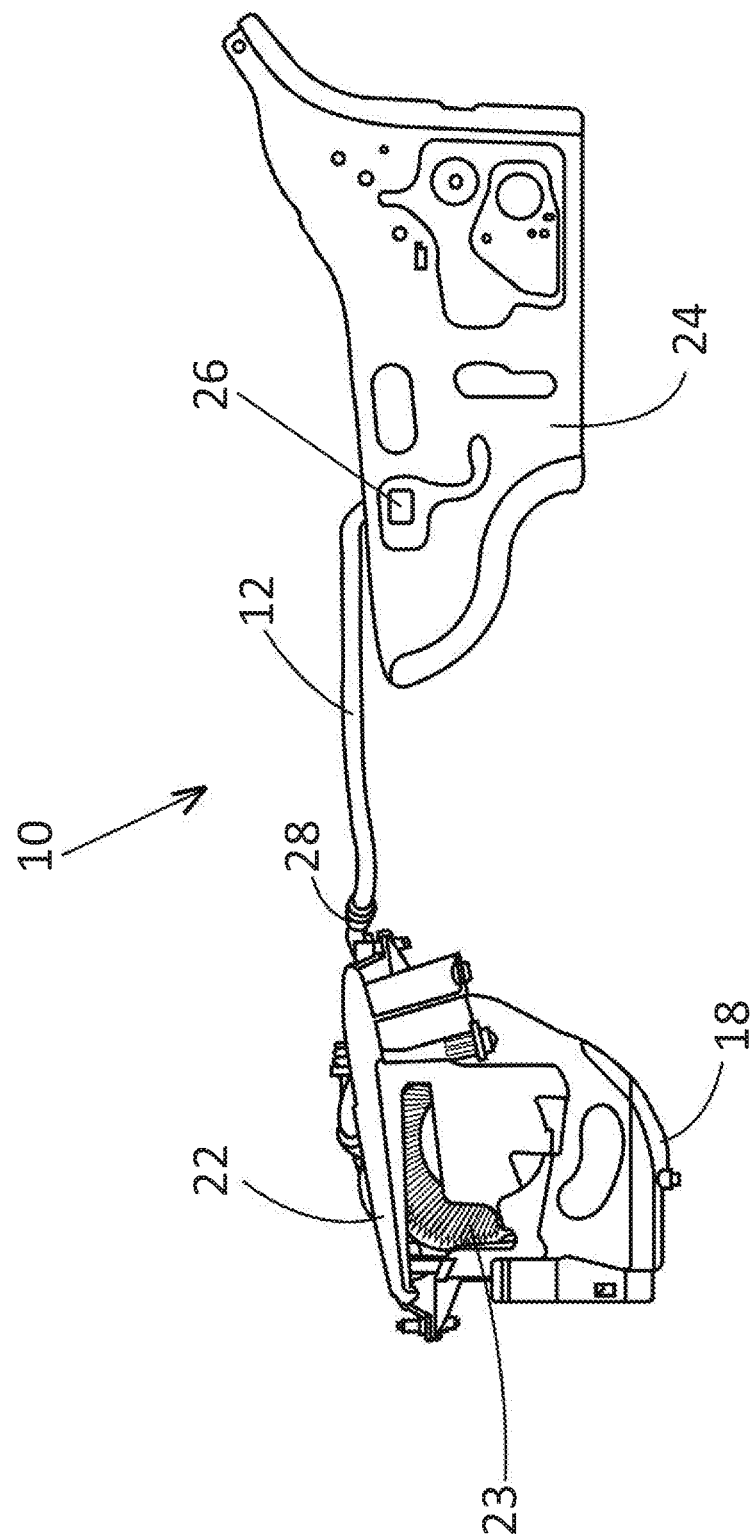
FIG. 3 is a first side schematic view of the soundtube system of FIG. 1.
Figure 4:
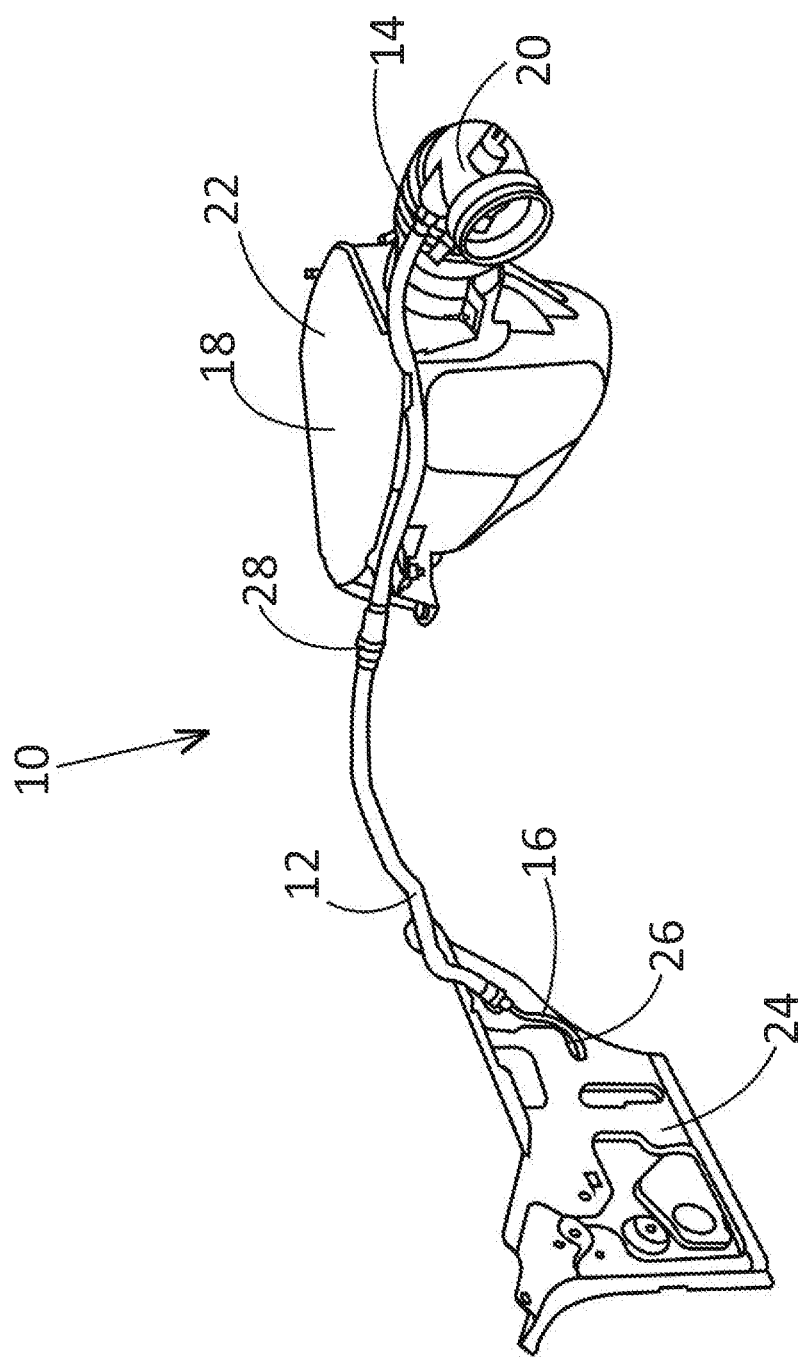
FIG. 4 is a perspective schematic view of the soundtube system of FIG. 1.
Figure 5:
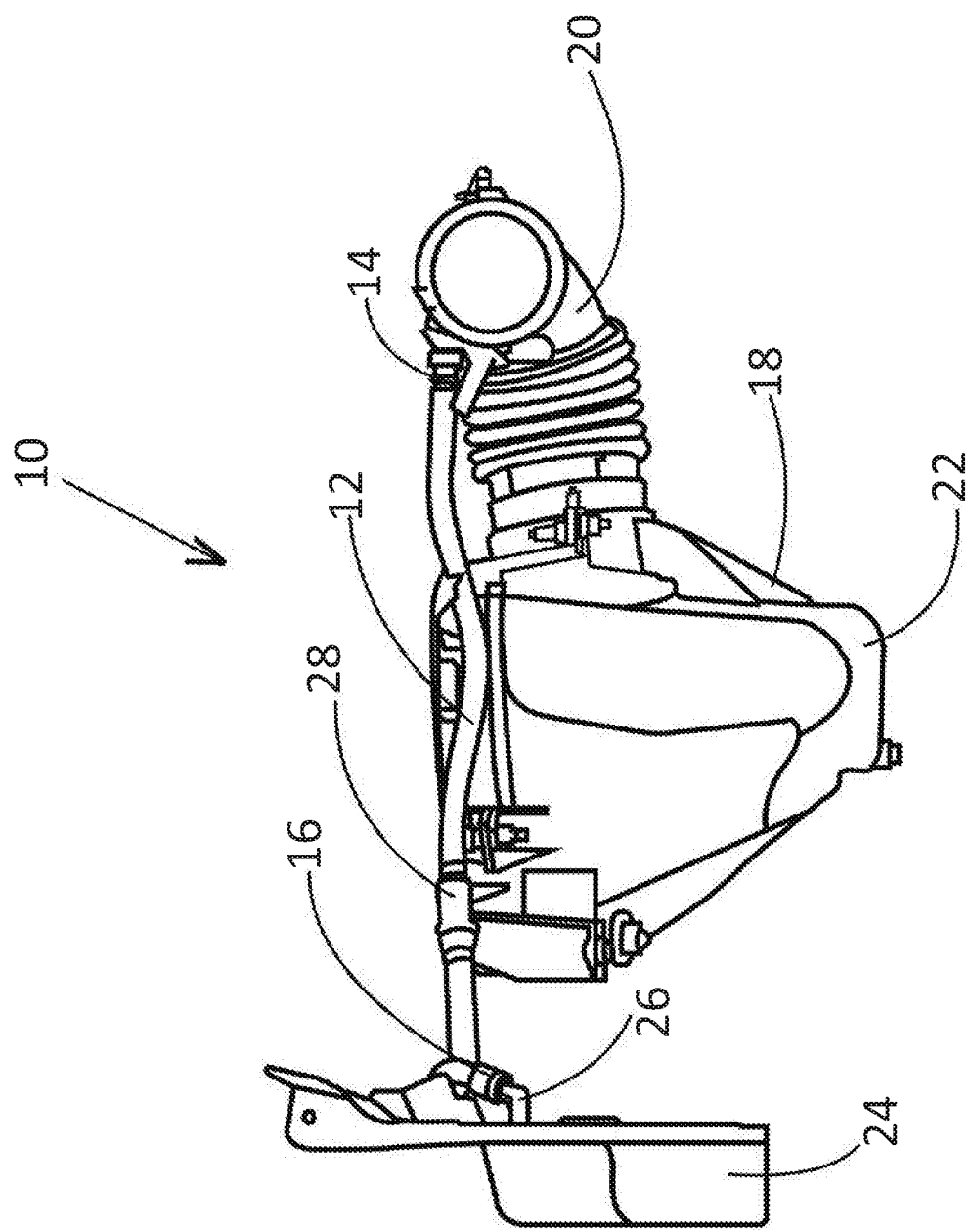
FIG. 5 is a second end schematic view of the soundtube system of FIG. 1.
Figure 6:
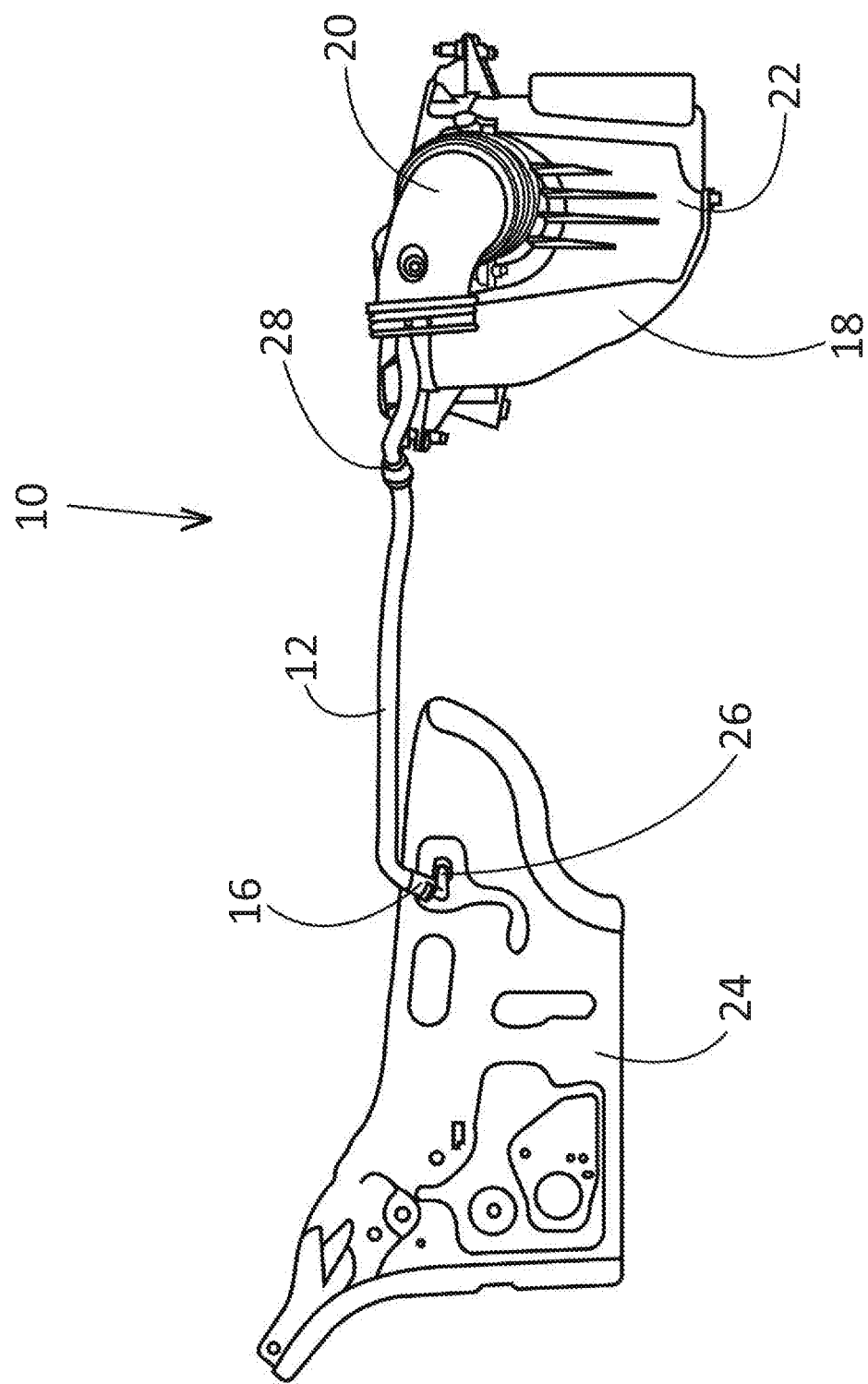
FIG. 6 is a second side schematic view of the soundtube system of FIG. 1.
Figure 7:
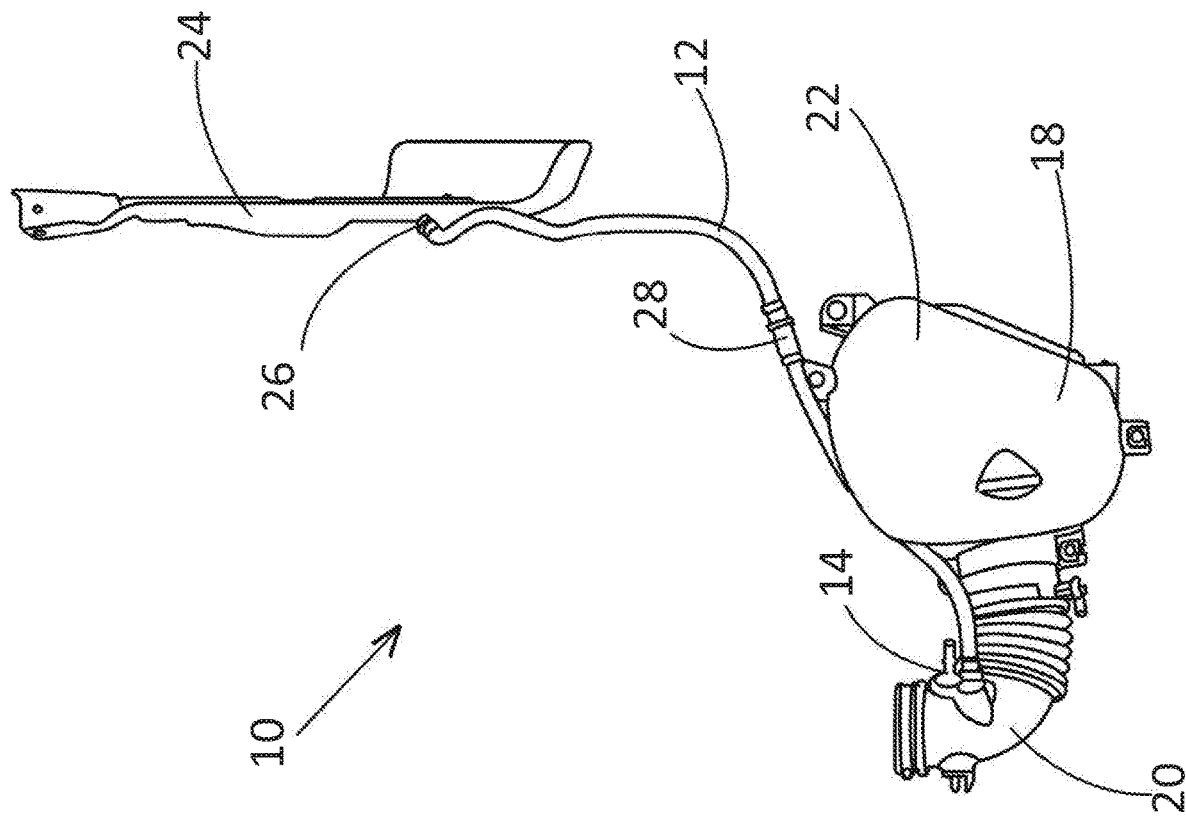
FIG. 7 is an underside schematic view of the soundtube system of FIG. 1.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate an intake manifold according to the disclosed inventive concept. Particularly, FIGS. 1 through 7 illustrate various views of an integrated HC trap and air filter arrangement according to the disclosed inventive concept incorporating a trap and filter in conjunction with an air cleaner box and a fresh air entrance attached to a vehicle fender. FIGS. 8 through 33 illustrate possible non-limiting alternative integrated HC traps and air filters according to the disclosed inventive concept.

FIGS. 1-7—Integrated HC Trap and Air Filter Arrangement

Referring to FIGS. 1 through 7, an integrated HC trap and air filter arrangement is illustrated generally as 10. The integrated HC trap and air filter arrangement 10 as presented herein is only suggestive as other non-limiting variations are possible. The integrated HC trap and air filter arrangement 10 includes a soundtube 12 having a first end 14 and a second end 16.

The first end 14 of the soundtube 12 is attached to an air cleaner box 18 or clean air tube 20. The air cleaner box 18 includes the clean air tube 20 that is coupled to the engine that is attached to an air filter housing 22 that includes a filter 23 shown in FIG. 3. The second end 16 of the soundtube 12 is in communication with ambient air and is preferably but not absolutely attached to the vehicle fender 24 by way of a fresh air fender inlet 26.

An integrated HC trap and air filter 28 is fitted in the soundtube 12 between the first end 14 and the second end 16. As will be discussed in detail, the integrated HC trap and air filter 28 includes a housing that may be formed from any resilient moldable material or metallic material that is a thermoplastic polymer. Such polymers include, but are not limited to, polyethylene, polypropylene, polyester, or nylon or a polyolefin-based polymer, a polystyrene-based polymer, a polycarbonate polymer, or mixture thereof. Within the housing is contained both air filter material, preferably in the form of an open cell reticulated foam and a hydrocarbon-adsorbing media. Such hydrocarbon media preferably though not exclusively includes activated charcoal, activated carbon pellets, activated carbon, carbon-impregnated paper, activated carbon-impregnated non-woven polyester, activated carbon-impregnated foam and zeolite. Regardless of the embodiment, the hydrocarbon-adsorbing material retains the hydrocarbons in the vehicle air intake system by adsorption.

During normal engine operation, air is drawn primarily into the air intake via the air cleaner box 18 and secondarily through the integrated HC trap and air filter 28 where particles and other contaminants are removed. The clean air then flows into the engine through intake manifold (neither shown). The integrated HC trap and air filter 28 of the disclosed inventive concept is advantageously integrated into the soundtube 12 as described in more detail below It is to be understood that the various embodiments of the integrated hydrocarbon traps and air filters of the disclosed inventive concept as discussed below may be used in a number of applications relative to the vehicle in addition to the air intake system.

The integrated HC trap and air filter 28 of the disclosed inventive concept may be provided in a number of variations. Some of the preferred variations are illustrated in FIGS. 8 through 30 and are discussed in conjunction therewith. Regardless of the embodiment, the housing of the integrated HC trap and air filter 28 has a cross-section that is of sufficient size to allow air to flow into the internal combustion engine during operation.

FIG. 8—First Embodiment—Integrated HC Trap and Air Filter

An embodiment of the disclosed inventive concept is illustrated in FIG. 8 in which an integrated hydrocarbon trap and air filter 40 is shown in cross section along its long axis. The integrated hydrocarbon trap and air filter 40 includes a two-piece body 42 that is formed from a thermoplastic polymer. Non-limiting examples of the preferred thermoplastic polymer suitable for use in forming the two-piece body 42 of the integrated hydrocarbon trap and air filter 40 include polyethylene, polypropylene or nylon or a polyolefin-based polymer, a polystyrene-based polymer, a polycarbonate polymer, or mixture thereof. It is to be understood that while the body 42 of the integrated hydrocarbon trap and air filter 40 is illustrated as having an end cap portion attached to the open end of an elongated body, the body may instead be formed from a first elongated half and a second elongated half joined lengthwise. This alternative construction is applicable to all embodiments of the disclosed integrated HC trap and air filter shown in the accompanying figures and discussed below.

The two-piece body 42 includes a first end 44 having an integrally formed central portion and a second end 46. The illustrated shape and size of the two-piece body 42 are suggestive and not intended as being limiting as other shapes and sizes may be adopted without compromising the function of the integrated hydrocarbon trap and air filter 40. The two parts of the two-piece body 42 illustrated in FIG. 8 as well as the two parts of all of the two-piece bodies illustrated in the figures may be attached to one another using any of several methods including but not limited to adhesives, press fitting, mechanical fastening, interference fitting, snap fitting, heat staking and welding.

The dual functions of the trapping of hydrocarbons and the filtering of air are made possible by providing media intended for these purposes in strategic locations within the two-piece body 42. One such arrangement is illustrated in FIG. 8 in which a first foam filter element 48 and a second foam filter element 49 are respectively positioned within the first end 44 and the second end 46 of the two-piece body 42.

A hydrocarbon trapping media 50 is positioned between the first foam filter element 48 and the second foam filter element 49. As illustrated, carbon pellets are the hydrocarbon trapping media 50 incorporated into the embodiment of the integrated hydrocarbon trap and air filter of FIG. 8. However, it is to be understood that other media may be used for this purpose. In addition, it is to be noted that while two foam filter elements (the first foam filter element 48 and the second foam filter element 49) are illustrated it is not necessary for air filtering purposes to have two air filter elements. The second additional air filter element is useful as it assists in restricting movement of the hydrocarbon trapping media 50. When the second air filter element is included, the overall design of the integrated hydrocarbon trap and air filter is simplified by using the same foam filter material for both filters.

The foam filter elements and the hydrocarbon trapping media of the first embodiment of the integrated hydrocarbon trap and air filter shown in FIG. 8 as well as the other embodiments illustrated in the figures and discussed in conjunction therewith are preferably but not absolutely fixed within the trap body. Fixation of the foam filter elements and the hydrocarbon trapping media inside the body may be accomplished by any of several methods including but not limited to adhesives, press fitting, mechanical fastening, interference fitting, snap fitting, heat staking and welding.

FIG. 9—Second Embodiment—Integrated HC Trap and Air Filter

Another embodiment of the disclosed inventive concept is illustrated in FIG. 9 in which an integrated hydrocarbon trap and air filter 60 is shown in cross section along its long axis. The integrated hydrocarbon trap and air filter 60 includes a two-piece body 62 that is formed from a thermoplastic polymer. Non-limiting examples of the preferred thermoplastic polymer suitable for use in forming the two-piece body 62 of the integrated hydrocarbon trap and air filter 60 are the same as those discussed above with respect to the integrated hydrocarbon trap and air filter 40.

The two-piece body 62 includes a first end 64 having an integrally formed central portion and a second end 66. The illustrated shape and size of the two-piece body 62 are suggestive and not intended as being limiting as other shapes and sizes may be adopted without compromising the function of the integrated hydrocarbon trap and air filter 60.

As shown in FIG. 9, foam filter elements are strategically located within the two-piece body 62. One such arrangement is illustrated in FIG. 9 in which a first foam filter element 68 and a second foam filter element 69 are respectively positioned within the first end 64 and the second end 66 of the two-piece body 62.

A hydrocarbon trapping media 70 is positioned between the first foam filter element 68 and the second foam filter element 69. As illustrated, carbon pellets are the hydrocarbon trapping media 70 incorporated into the embodiment of the integrated hydrocarbon trap and air filter of FIG. 9. As an alternative to the integrated hydrocarbon trap and air filter 40 of FIG. 8 in which the hydrocarbon trapping media 50 completely fills the space defined between the first foam filter element 48 and the second foam filter element 49, the level of the hydrocarbon trapping media 70 is kept below the bottom of the openings formed in the first end 64 and the second end 66, thereby readily allowing air to pass above the surface of the hydrocarbon trapping media 70 as may be preferred for certain applications.

FIG. 10—Third Embodiment—Integrated HC Trap and Air Filter

A further embodiment of the disclosed inventive concept is illustrated in FIG. 10 in which an integrated hydrocarbon trap and air filter 80 is shown in cross section along its long axis. The integrated hydrocarbon trap and air filter 80 includes a two-piece body 82 that is formed from a thermoplastic polymer. Non-limiting examples of the preferred thermoplastic polymer suitable for use in forming the two-piece body 82 of the integrated hydrocarbon trap and air filter 80 are the same as those discussed above with respect to the integrated hydrocarbon trap and air filter 40.

The two-piece body 82 includes a first end 84 having an integrally formed central portion and a second end 86. The illustrated shape and size of the two-piece body 82 are suggestive and not intended as being limiting as other shapes and sizes may be adopted without compromising the function of the integrated hydrocarbon trap and air filter 80.

As shown in FIG. 10, foam filter elements are strategically located within the two-piece body 82. A first foam filter element 88 and a second foam filter element 90 are respectively positioned within the first end 84 and the second end 86 of the two-piece body 82. A third foam filter element 92 is positioned between the first foam filter element 88 and the second foam filter element 90. Beneath the third foam filter element 92 and between the first foam filter element 88 and the second foam filter element 90 is provided a hydrocarbon trapping media 94. Carbon pellets are shown as being the hydrocarbon trapping media 94 although alternative media may be adopted as discussed above.

FIG. 11—Fourth Embodiment—Integrated HC Trap and Air Filter

Another embodiment of the disclosed inventive concept is illustrated in FIG. 11 in which an integrated hydrocarbon trap and air filter 100 is shown in cross section along its long axis. The integrated hydrocarbon trap and air filter 100 includes a two-piece body 102 that is formed from a thermoplastic polymer. Non-limiting examples of the preferred thermoplastic polymer suitable for use in forming the two-piece body 102 of the integrated hydrocarbon trap and air filter 100 are the same as those discussed above with respect to the integrated hydrocarbon trap and air filter 40.

The two-piece body 102 includes a first end 104 having an integrally formed central portion and a second end 106. The illustrated shape and size of the two-piece body 102 are suggestive and not intended as being limiting as other shapes and sizes may be adopted without compromising the function of the integrated hydrocarbon trap and air filter 100.

As shown in FIG. 11, foam filter elements are strategically located within the two-piece body 102. A first foam filter element 108 and a second foam filter element 110 are respectively positioned within the first end 104 and the second end 106 of the two-piece body 102. A third foam filter element 112 is positioned between the first foam filter element 108 and the second foam filter element 110. Beneath the third foam filter element 112 and between the first foam filter element 108 and the second foam filter element 110 is provided a hydrocarbon trapping media 114. Carbon pellets are shown as being the hydrocarbon trapping media 114 although alternative media may be adopted as discussed above. As an alternative to the integrated hydrocarbon trap and air filter 80 of FIG. 10 in which the third foam filter element 92 completely fills the space defined between the first foam filter element 88, the second foam filter element 90, and above the hydrocarbon trapping media 94, the upper surface of the third foam filter element 112 of the integrated hydrocarbon trap and air filter 100 does not fill the entire space and, instead, readily allowing air to pass above the surface of the third foam filter element 112 as may be preferred for certain applications.

Figure 12:
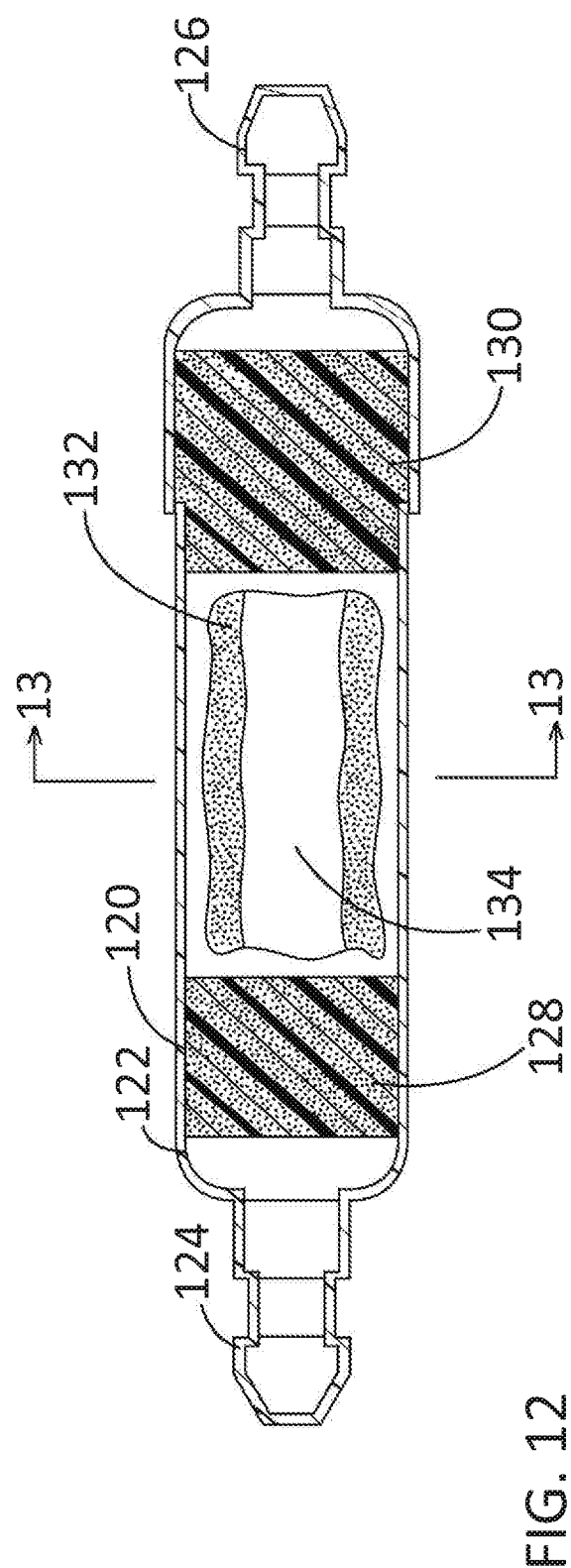
FIG. 12 is a sectional view of another embodiment of an integrated HC trap and air filter according to the disclosed inventive concept taken along the long axis.
Figure 13:
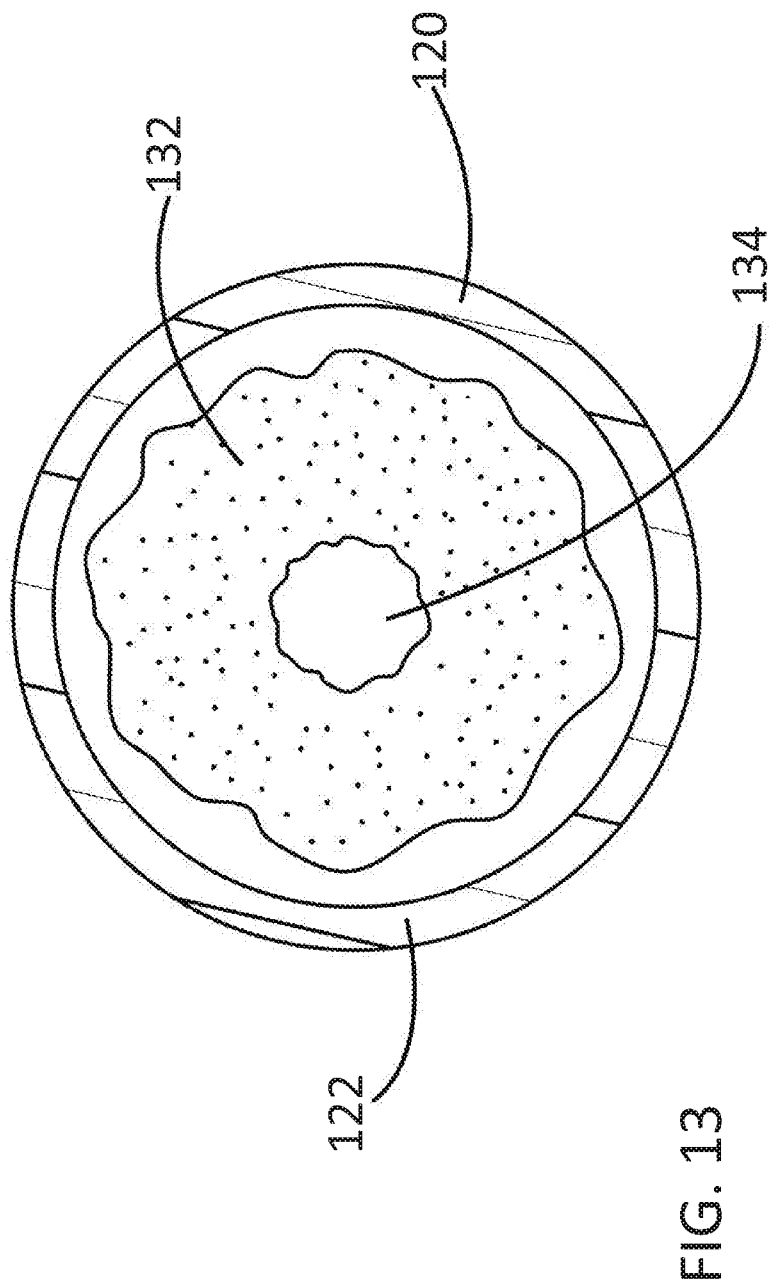
FIG. 13 is a sectional view of the integrated HC trap and air filter of FIG. 12 taken along line 13-13.

FIGS. 12-13—Fifth Embodiment—Integrated HC Trap and Air Filter

An additional embodiment of the disclosed inventive concept is illustrated in FIG. 12 in which an integrated hydrocarbon trap and air filter 120 is shown in cross section along its long axis while FIG. 13 illustrates the hydrocarbon trap and air filter 120 shown in cross section along lines 13-13 of FIG. 12. FIGS. 12 and 13 collectively illustrate the fifth embodiment of the integrated HC trap and air filter according to the disclosed inventive concept. With reference to these two figures, the integrated hydrocarbon trap and air filter 120 includes a two-piece body 122 that is formed from a thermoplastic polymer. Non-limiting examples of the preferred thermoplastic polymer suitable for use in forming the two-piece body 122 of the integrated hydrocarbon trap and air filter 120 are the same as those discussed above with respect to the integrated hydrocarbon trap and air filter 40.

The two-piece body 122 includes a first end 124 having an integrally formed central portion and a second end 126. The illustrated shape and size of the two-piece body 122 are suggestive and not intended as being limiting as other shapes and sizes may be adopted without compromising the function of the integrated hydrocarbon trap and air filter 120.

The foam filter elements are strategically located within the two-piece body 122. A first foam filter element 128 and a second foam filter element 130 are respectively positioned within the first end 124 and the second end 126 of the two-piece body 122. Between the first foam filter element 128 and the second foam filter element 130 is positioned a hydrocarbon trapping media 132. In this embodiment, the hydrocarbon trapping media is a loose media, such as carbon pellets, encased in a "tea bag" having an air-permeable enclosure. At least a portion of the outer surface of the hydrocarbon trapping media 132 may be attached to the inner surface of the two-piece body 122 by, for example, an adhesive. A passageway 134 is formed through the approximate center of the hydrocarbon trapping media 132. The passageway 134 allows for the passage of air through the hydrocarbon trapping media 132 as may be preferred for certain applications.

Figure 14:
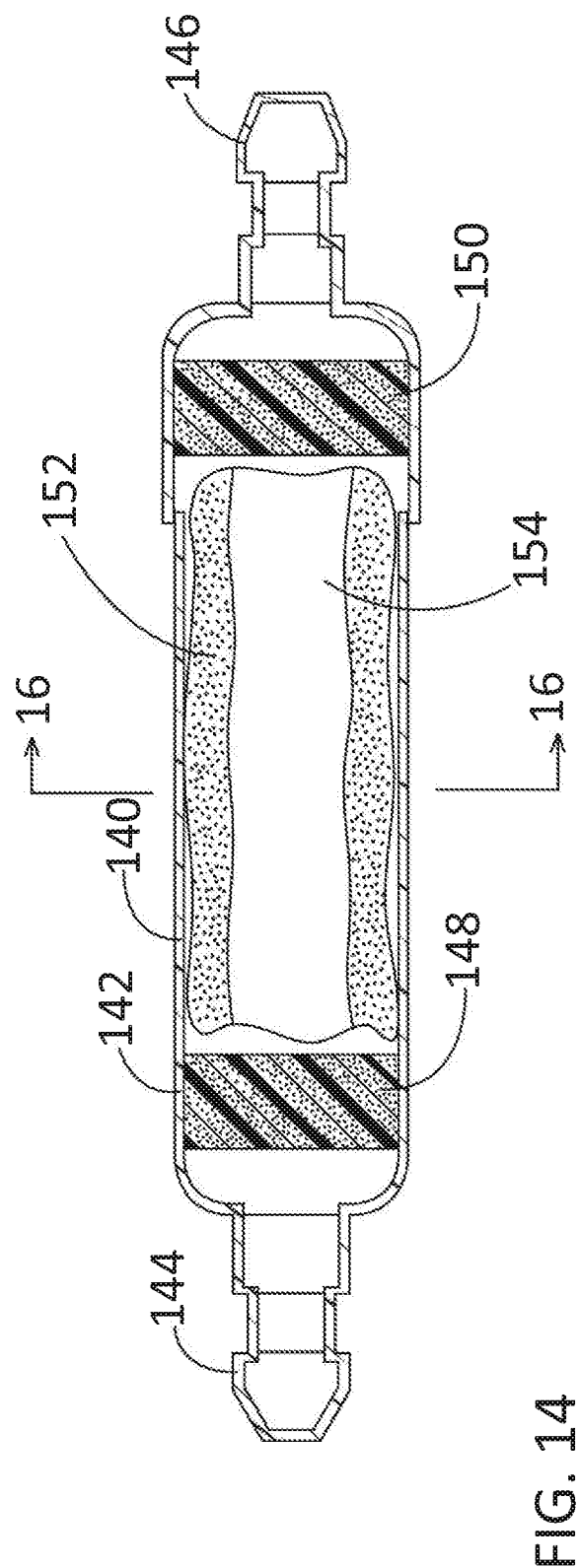
FIG. 14 is a sectional view of another embodiment of an integrated HC trap and air filter according to the disclosed inventive concept taken along the long axis.
Figure 15:
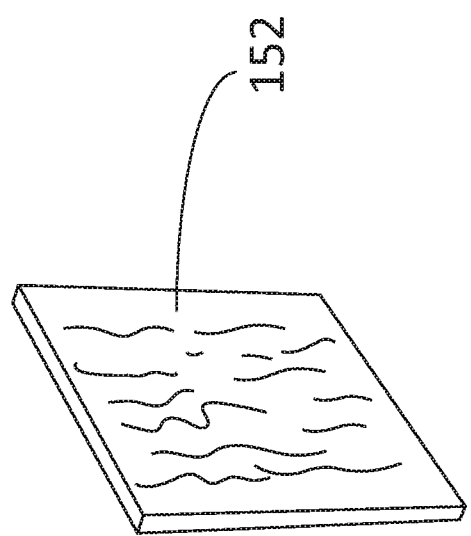
FIG. 15 is a perspective view of the perimeter wrap incorporated into the integrated HC trap and air filter of FIG. 14.
Figure 16:
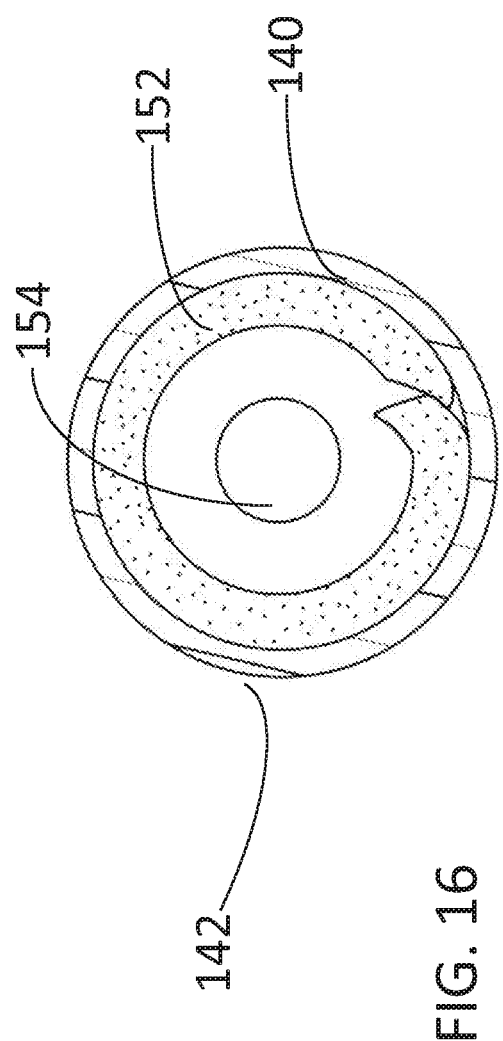
FIG. 16 is a sectional view of the integrated HC trap and air filter of FIG. 14 taken along line 16-16.

FIGS. 14-16—Sixth Embodiment—Integrated HC Trap and Air Filter

FIGS. 14, 15 and 16 collectively illustrate the sixth embodiment of the integrated HC trap and air filter according to the disclosed inventive concept. With reference particularly to FIG. 14, an integrated hydrocarbon trap and air filter 140 is shown in cross section along its long axis. The integrated hydrocarbon trap and air filter 140 includes a two-piece body 142 that is formed from a thermoplastic polymer. Non-limiting examples of the preferred thermoplastic polymer suitable for use in forming the two-piece body 142 of the integrated hydrocarbon trap and air filter 140 are the same as those discussed above with respect to the integrated hydrocarbon trap and air filter 40. The two-piece body 142 includes a first end 144 having an integrally formed central portion and a second end 146. The illustrated shape and size of the two-piece body 142 are suggestive and not intended as being limiting as other shapes and sizes may be adopted without compromising the function of the integrated hydrocarbon trap and air filter 140. Also as shown in FIG. 14, foam filter elements are strategically located within the two-piece body 142. A first foam filter element 148 and a second foam filter element 150 are respectively positioned within the first end 144 and the second end 146 of the two-piece body 142.

Between the first foam filter element 148 and the second foam filter element 150 is positioned a hydrocarbon trapping media 152. In this embodiment, the hydrocarbon trapping media is a layer or sheet of hydrocarbon trapping material as illustrated in FIG. 15.

At least a portion of the outer surface of the hydrocarbon trapping media 152 may be attached to the inner surface of the two-piece body 142 by, for example, an adhesive. Alternatively, the sheet of hydrocarbon trapping material 152 may be first formed into a tube which can be inserted into the two-piece body 142 prior to assembly. As illustrated in FIG. 14 as well as in FIG. 16 which is a sectional view taken along line 16-16 of FIG. 14, a passageway 154 is formed through the approximate center of the hydrocarbon trapping media 152. The passageway 154 allows for the passage of air through the hydrocarbon trapping media 152 as may be preferred for certain applications.

Figure 19:
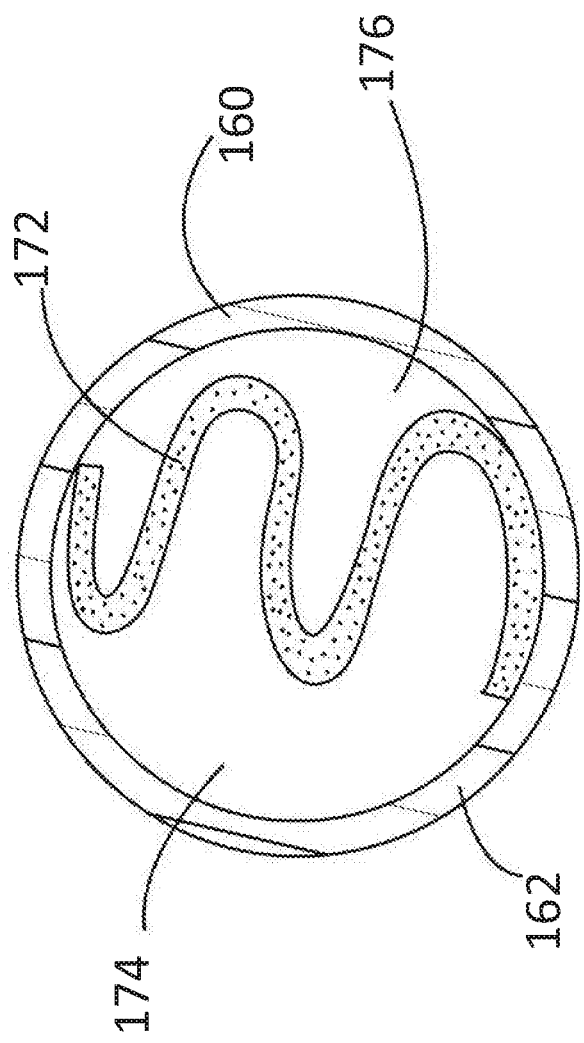
FIG. 19 is a sectional view of the integrated HC trap and air filter of FIG. 17 taken along line 19-19.

FIGS. 17-19—Seventh Embodiment—Integrated HC Trap and Air Filter

FIGS. 17, 18 and 19 collectively illustrate the seventh embodiment of the integrated HC trap and air filter according to the disclosed inventive concept. With reference particularly to FIG. 17, an integrated hydrocarbon trap and air filter 160 is shown in cross section along its long axis. The integrated hydrocarbon trap and air filter 160 includes a two-piece body 162 that is formed from a thermoplastic polymer. Non-limiting examples of the preferred thermoplastic polymer suitable for use in forming the two-piece body 162 of the integrated hydrocarbon trap and air filter 160 are the same as those discussed above with respect to the integrated hydrocarbon trap and air filter 40.

The two-piece body 162 includes a first end 164 having an integrally formed central portion and a second end 166. The illustrated shape and size of the two-piece body 162 are suggestive and not intended as being limiting as other shapes and sizes may be adopted without compromising the function of the integrated hydrocarbon trap and air filter 160. Also as shown in FIG. 17, foam filter elements are strategically located within the two-piece body 162. A first foam filter element 168 and a second foam filter element 170 are respectively positioned within the first end 164 and the second end 166 of the two-piece body 162.

Between the first foam filter element 168 and the second foam filter element 170 is positioned a hydrocarbon trapping media 172. In this embodiment, the hydrocarbon trapping media is a pleated layer or sheet of hydrocarbon trapping material as illustrated in FIG. 18. By pleating the sheet of hydrocarbon trapping media 172, the surface area of the hydrocarbon trapping media 172 is increased thereby improving overall hydrocarbon adsorption.

As particularly illustrated in FIG. 19 which is a sectional view taken along line 19-19 of FIG. 17, a first lateral passageway 174 is formed on one side of the hydrocarbon trapping media 172 while a second lateral passageway 176 is formed on the other side of the hydrocarbon trapping media 172. The lateral passageways 174 and 176 allow for the passage of air by the hydrocarbon trapping media 172 as may be preferred for certain applications.

FIG. 20—Eighth Embodiment—Integrated HC Trap and Air Filter

An additional embodiment of the disclosed inventive concept is illustrated in FIG. 20 in which an integrated hydrocarbon trap and air filter 180 is shown in cross section along its long axis. The integrated hydrocarbon trap and air filter 180 includes a two-piece body 182 that is formed from a thermoplastic polymer. Non-limiting examples of the preferred thermoplastic polymer suitable for use in forming the two-piece body 182 of the integrated hydrocarbon trap and air filter 180 include polyethylene, polypropylene or nylon or a polyolefin-based polymer, a polystyrene-based polymer, a polycarbonate polymer, or mixture thereof.

The two-piece body 182 includes a first end 184 having an integrally formed central portion and a second end 186. The illustrated shape and size of the two-piece body 182 are suggestive and not intended as being limiting as other shapes and sizes may be adopted without compromising the function of the integrated hydrocarbon trap and air filter 180.

The dual functions of the trapping of hydrocarbons and the filtering of air are made possible by providing media intended for these purposes in strategic locations within the two-piece body 182. One such arrangement is illustrated in FIG. 20 in which a first foam filter element 188 and a second foam filter element 190 are respectively positioned within the first end 184 and the second end 186 of the two-piece body 182.

A hydrocarbon trapping media 192 is positioned between the first foam filter element 188 and the second foam filter element 190. A first air gap 194 is formed between the first foam filter element 188 and the hydrocarbon trapping media 192 and a second air gap 196 is formed between the second foam filter element 190 and the hydrocarbon trapping media 192. A greater or lesser number of hydrocarbon trapping media, foam filter elements, and air gaps may be provided. As illustrated, carbon pellets are the hydrocarbon trapping media 192 incorporated into the embodiment of the integrated hydrocarbon trap and air filter of FIG. 20. However, it is to be understood that other media may be used for this purpose.

FIG. 21—Ninth Embodiment—Integrated HC Trap and Air Filter

A further embodiment of the disclosed inventive concept is illustrated in FIG. 21 in which an integrated hydrocarbon trap and air filter 200 is shown in cross section along its long axis. The integrated hydrocarbon trap and air filter 200 includes a two-piece body 202 that is formed from a thermoplastic polymer. Non-limiting examples of the preferred thermoplastic polymer suitable for use in forming the two-piece body 202 of the integrated hydrocarbon trap and air filter 200 include polyethylene, polypropylene or nylon or a polyolefin-based polymer, a polystyrene-based polymer, a polycarbonate polymer, or mixture thereof.

The two-piece body 202 includes a first end 204 having an integrally formed central portion and a second end 206. The illustrated shape and size of the two-piece body 202 are suggestive and not intended as being limiting as other shapes and sizes may be adopted without compromising the function of the integrated hydrocarbon trap and air filter 200.

The dual functions of the trapping of hydrocarbons and the filtering of air are made possible by providing media intended for these purposes in strategic locations within the two-piece body 202. One such arrangement is illustrated in FIG. 21 in which a first foam filter element 208 and a second foam filter element 210 are respectively positioned within the first end 204 and the second end 206 of the two-piece body 202.

A hydrocarbon trapping media 212 is positioned within the two-piece body 202. The integrated hydrocarbon trap and air filter 200 can also help control NVH by the provision of an NVH media such as a first NVH element 214 positioned between the first foam filter element 208 and the hydrocarbon trapping media 212 and a second NVH element 216 positioned between the second foam filter element 210 and the hydrocarbon trapping media 212. The NVH elements 214 and 216 may be formed from a variety of materials including, but not limited to, foamed polyurethane, polyvinyl chloride nitrile butadiene rubber (NBR), and ethylene propylene diene monomer (EPDM) and non-woven polyester impregnated dampening media. A greater or lesser number of hydrocarbon trapping media, foam filter elements, and NVH elements may be provided. As illustrated, carbon pellets are the hydrocarbon trapping media 212 incorporated into the embodiment of the integrated hydrocarbon trap and air filter of FIG. 21. However, it is to be understood that other media may be used for this purpose.

Figure 22:
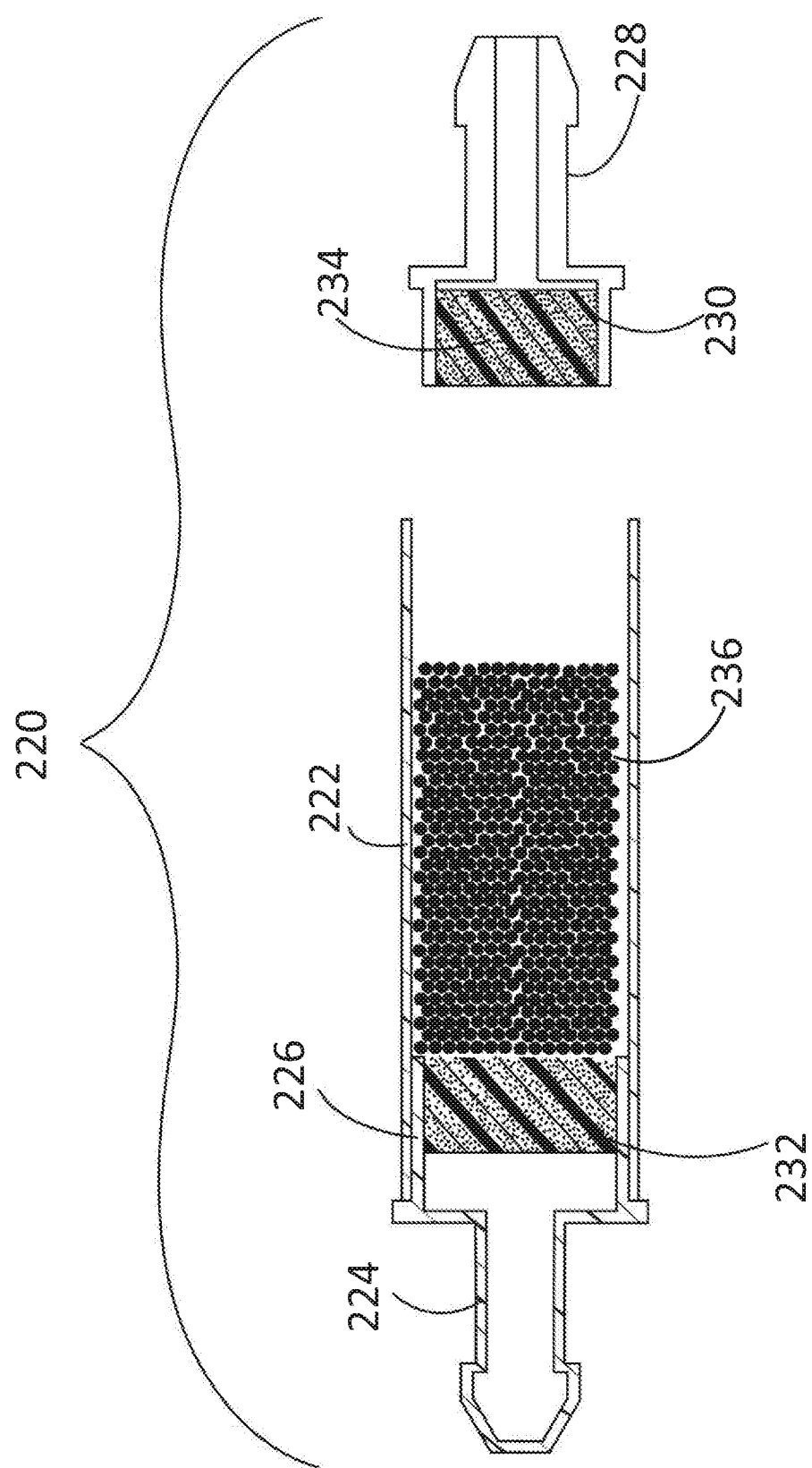
FIG. 22 is a sectional view of another embodiment of an integrated HC trap and air filter according to the disclosed inventive concept taken along the long axis in which one of the end caps has been separated from the body.

FIG. 22—Tenth Embodiment—Integrated HC Trap and Air Filter

A further embodiment of the disclosed inventive concept is illustrated in FIG. 22 in which a partially exploded integrated hydrocarbon trap and air filter 220 is shown in cross section along its long axis. The integrated hydrocarbon trap and air filter 220 includes a tubular center body portion 222 that is preferably a length of rubber hose or rigid tube that is cut to a preferred length to suit a specific purpose. The integrated hydrocarbon trap and air filter 220 further includes a first end cap 224 having a first end cap body 226 and a second end cap 228 having a second end cap body 230. Each of the end caps 224 and 228 is formed from a thermoplastic polymer. Non-limiting examples of the preferred thermoplastic polymer suitable for use in forming the end caps 224 and 228 are the same as those discussed above with respect to the integrated hydrocarbon trap and air filter 220. The illustrated shape and size of the end caps 224 and 228 are suggestive and not intended as being limiting as other shapes and sizes may be adopted without compromising the function of the integrated hydrocarbon trap and air filter 220.

As shown in FIG. 22, foam filter elements are strategically located within the end caps 224 and 228. A first foam filter element 232 is positioned within the first end cap body 226 of the first end cap 224. A second foam filter element 234 is positioned within the second end cap body 230 of the second end cap 228. Particularly, the first foam filter element 232 is positioned inside of body 226 of the first end cap 224 completely filling it and the second foam filter element 234 is positioned inside of the body 230 of the second end cap 228 also completely filing it. The foam filter elements 232 and 234 are fixed inside end caps 224 and 228 respectively. Fixation of the foam filter elements inside the end caps may be accomplished by any of several methods including but not limited to adhesives, press fitting, mechanical fastening, interference fitting, snap fitting, heat staking and welding. One or both of the end caps 224 and 228 is attached to the tubular center body portion 222 but the other end cap is not. Attachment of one or both of the end caps 224 and 228 to the tubular center body portion 222 may be made by adhesives, press fitting, mechanical fastening, interference fitting, snap fitting, heat staking and welding.

A hydrocarbon trapping media 236 is positioned between the first foam filter element 232 and the second foam filter element 234. As illustrated, carbon pellets are the hydrocarbon trapping media 236 incorporated into the embodiment of the integrated hydrocarbon trap and air filter of FIG. 22. However, it is to be understood that other media may be used for this purpose.

Figure 23:
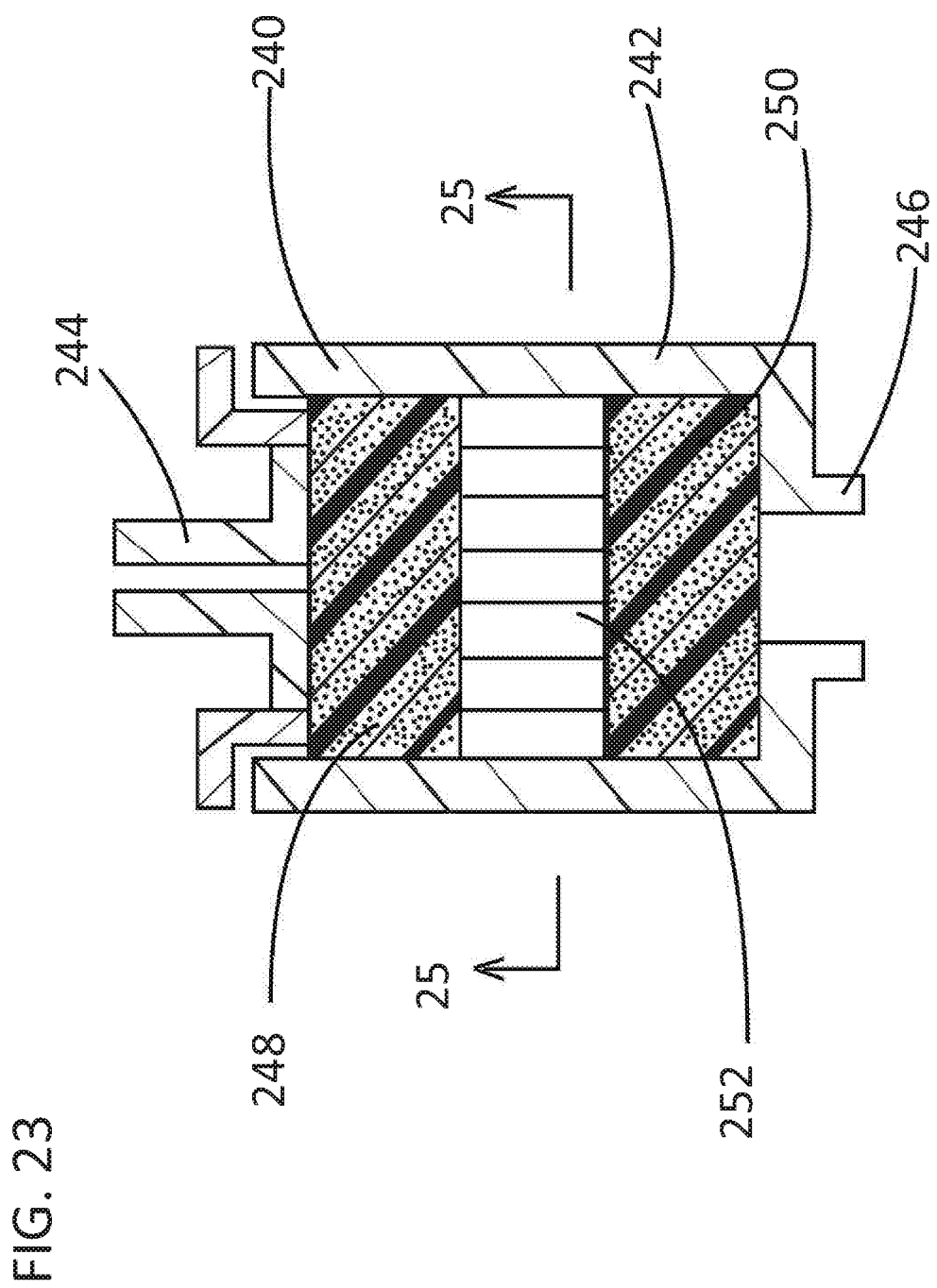
FIG. 23 is a sectional view of another embodiment of an integrated HC trap and air filter according to the disclosed inventive concept taken along the long axis.
Figure 24:
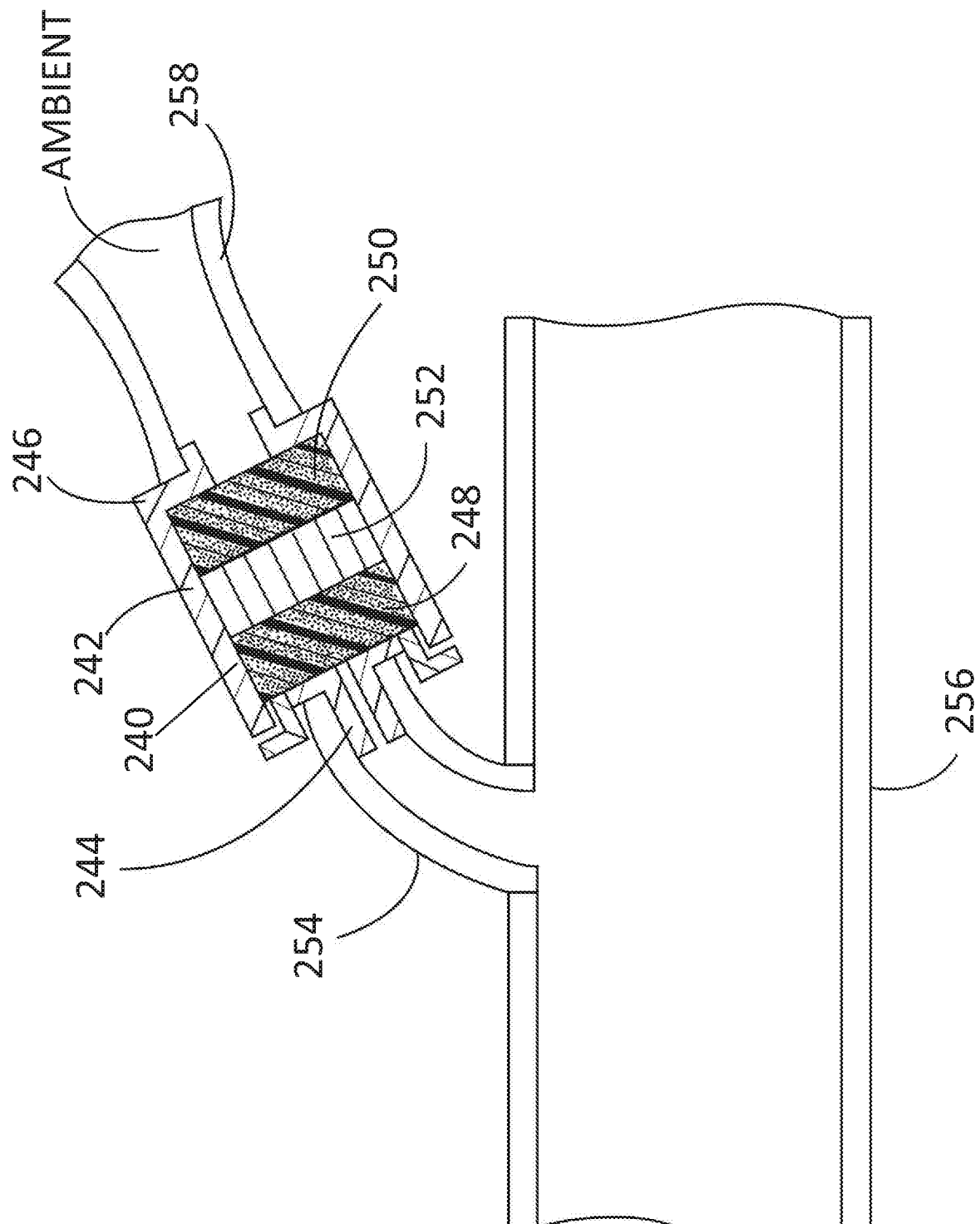
FIG. 24 is a sectional view of the integrated HC trap and air filter of FIG. 23 taken along line 25-25.
Figure 25:
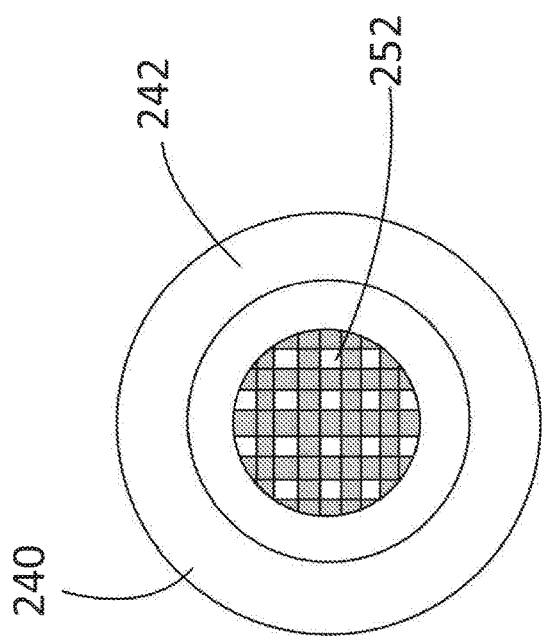
FIG. 25 is a sectional view of an integrated HC trap and air filter arrangement that incorporates the HC trap and air filter of FIG. 23.

FIGS. 23-25—Eleventh Embodiment—Integrated HC Trap and Air Filter

FIGS. 23, 24 and 25 collectively illustrate the ninth embodiment of the integrated HC trap and air filter according to the disclosed inventive concept. With reference particularly to FIG. 23, an integrated hydrocarbon trap and air filter 240 is shown in cross section along its long axis. The integrated hydrocarbon trap and air filter 240 includes a two-piece body 242 that is formed from a thermoplastic polymer. Non-limiting examples of the preferred thermoplastic polymer suitable for use in forming the two-piece body 242 of the integrated hydrocarbon trap and air filter 240 include polyethylene, polypropylene or nylon or a polyolefin-based polymer, a polystyrene-based polymer, a polycarbonate polymer, or mixture thereof. The illustrated shape and size of each of the cover 244 and the body 246 are suggestive and not intended as being limiting as other shapes and sizes may be adopted without compromising the function of the integrated hydrocarbon trap and air filter 240.

The dual functions of the trapping of hydrocarbons and the filtering of air are made possible by providing media intended for these purposes in strategic locations within the two-piece body 242. The integrated hydrocarbon trap and air filter 240 includes a first foam filter element 248 and a second foam filter element 250. Positioned between the first foam filter element 248 and the second foam filter element 250 is a hydrocarbon trap media cage 252 that contains a hydrocarbon trapping media such as carbon pellets.

A sectional view of the hydrocarbon trap media cage 252 is illustrated in FIG. 24 taken along line 25-25 of FIG. 23. By placing the carbon pellets in the hydrocarbon trap media cage 252, assembly of the integrated hydrocarbon trap and air filter 240 is thus simplified, allowing easy assembly by first inserting the second foam filter element 250 into the body 246, followed by insertion of the media-containing hydrocarbon trap media cage 252, the first foam filter element 248, and completed by attaching the cover 244.

The integrated hydrocarbon trap and air filter 240 may be used in a number of applications relative to the vehicle in addition to the air intake system previously discussed. One such application is illustrated in FIG. 25 in which the integrated hydrocarbon trap and air filter 240 is positioned in a soundtube that includes a first tube portion 254 that is connected to the integrated hydrocarbon trap and air filter 240 and a component of the vehicle's air induction system such as a clean air tube 256. A second tube portion 258 is connected to the integrated hydrocarbon trap and air filter 240 at one end and is open to ambient at the other end.

Figure 26:
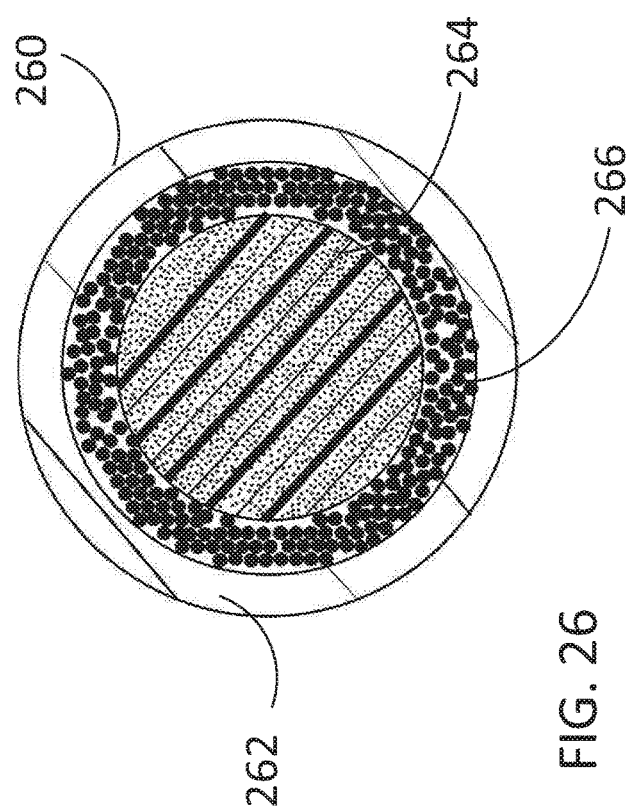
FIG. 26 is a sectional view of the integrated HC trap and air filter according to another embodiment of the disclosed inventive concept taken along the short axis.

FIG. 26—Twelfth Embodiment—Integrated HC Trap and Air Filter

Figure 27:
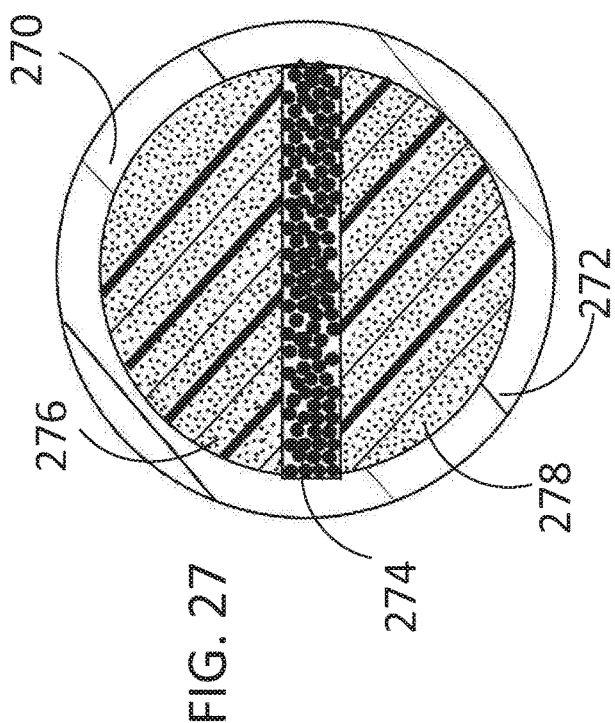
FIG. 27 is a sectional view of an integrated HC trap and air filter according to another embodiment of the disclosed inventive concept taken along the short axis.

In addition to the various arrangements of hydrocarbon trapping media and air filter media discussed above and illustrated in the figures, additional variations are illustrated in FIGS. 26 and 27. Referring to FIG. 26, an integrated hydrocarbon trap and air filter 260 is illustrated in cross-section. The integrated hydrocarbon trap 260 includes a housing 262 having a central foam air filter element 264 surrounded by a hydrocarbon trapping media 266. The hydrocarbon trapping media 266 may be pelletized or a sheet.

FIG. 27—Thirteenth Embodiment—Integrated HC Trap and Air Filter

Referring to FIG. 27, an integrated hydrocarbon trap and air filter 270 is illustrated in cross-section. The integrated hydrocarbon trap 270 includes a housing 272 having a hydrocarbon trapping media 274. The hydrocarbon trapping media 274 may be pelletized or a sheet. The hydrocarbon trapping media 274 is sandwiched between a first foam air filter element 276 and a second foam air filter element 278.

FIGS. 28-33—Fourteenth Embodiment—Integrated HC Trap and Air Filter

Figure 28:
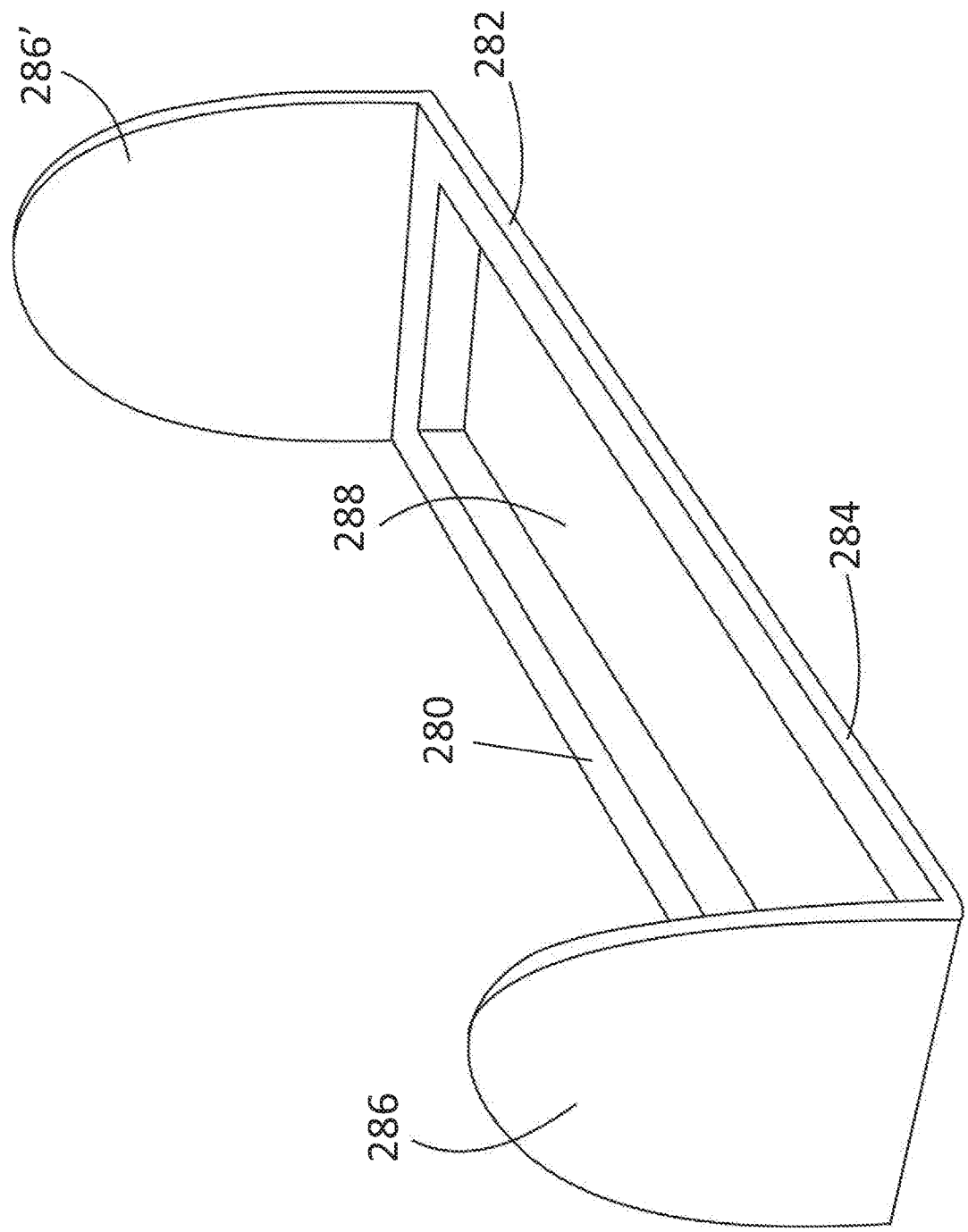
FIG. 28 is a peripheral view of the base of an integrated HC trap and air filter according to an additional embodiment of the disclosed inventive concept.

As a further variation of the disclosed inventive concept, FIGS. 28 through 33 illustrate an integrated hydrocarbon and air filter that is first formed as an assembly prior to fitting within a housing. Referring to FIGS. 28 and 29, perspective views of an integrated hydrocarbon trap and air filter 280 are illustrated. In FIG. 28, only a base 282 of the hydrocarbon trap and air filter 280 is shown. The base 282 includes a lower elongated portion 284 having a pair of opposed upturned ends 286 and 286'. The base 282 is formed from the air filter material discussed above with respect to other embodiments. The upturned ends 286 and 286' are integral with the lower elongated portion 284.

A recessed area 288 is formed in the lower elongated portion 284 for holding hydrocarbon trapping media. The base 282 including the recessed area 288 may be formed by a variety of methods including, but not limited to, stamping, die cutting, and thermoforming.

Figure 29A:
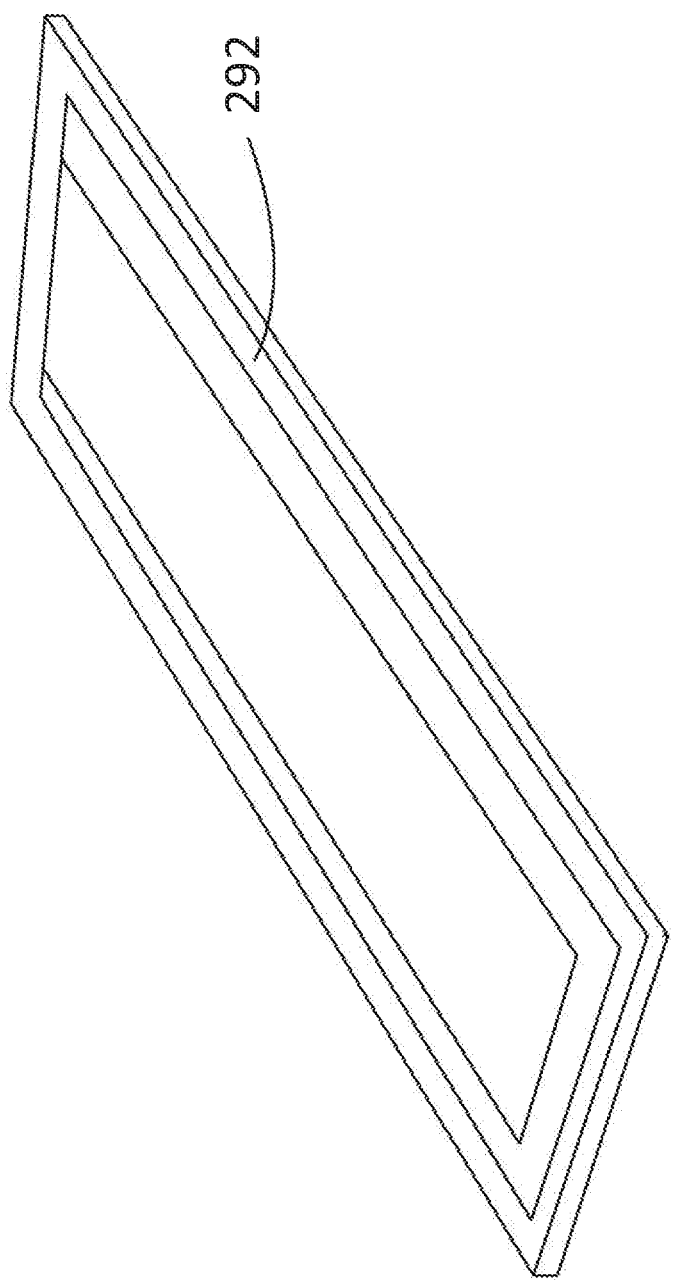
FIG. 29A is the same view of the base of the integrated HC trap and air filter of FIG. 28 but illustrating the cover layer in isolation.
Figure 29B:
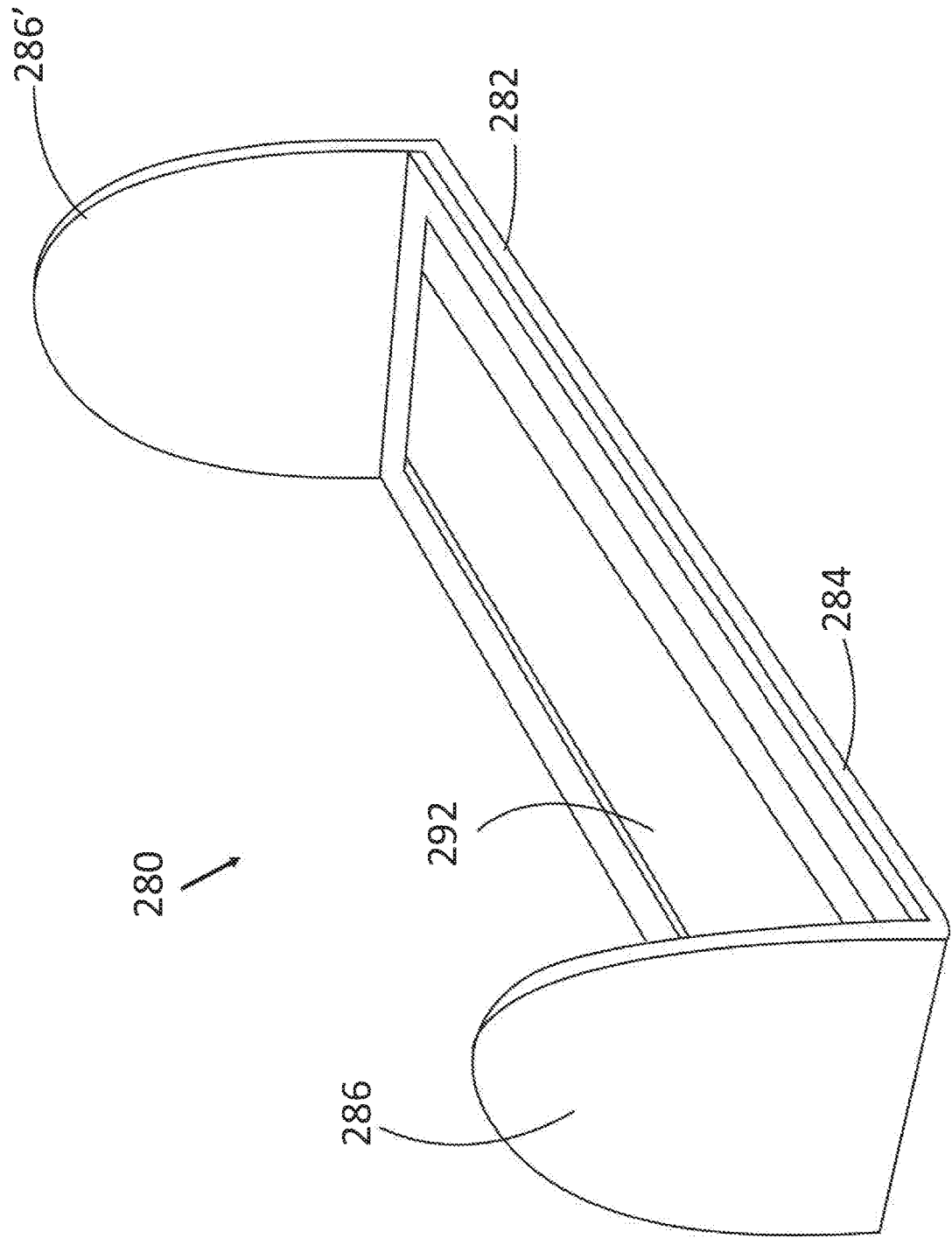
FIG. 29B is the same view of the base of the integrated HC trap and air filter of FIG. 28 but illustrating the cover layer in position over the recessed area that holds the hydrocarbon trapping media.

FIG. 29A illustrates a cover 292 in isolation. FIG. 29B illustrates the cover 292 in position over the recessed area 288. The cover 292 is attached to the lower elongated portion 284 by any of several methods such as, but not limited to, welding and adhesive bonding. FIG. 30 is a side view of the integrated hydrocarbon trap and air filter 280 illustrating the cover 292 attached to the lower elongated portion 284.

The lower elongated portion 284 of the integrated hydrocarbon trap and air filter 280 is illustrated in FIGS. 29 and 30 as being separate from the cover 292. As an alternative arrangement of this embodiment, the cover may be integrally formed with the lower elongated portion as illustrated in FIG. 31. With reference thereto, a side view of an integrated hydrocarbon trap and air filter 294 is illustrated. The integrated hydrocarbon trap and air filter 294 includes a lower elongated portion 296 having an integral single upturned end 298. A recessed area 300 is formed in the lower elongated portion 296 for holding hydrocarbon trapping media. Extending from the end of the lower elongated portion 296, opposite that of the single upturned end 298, is a cover 302 that is integrated with the lower elongated portion 296. Once the hydrocarbon trapping media is placed in the recessed area 300, the cover 302 is rotated into position over the recessed area 300 as indicated by the area that shows the direction of travel.

Figure 32:
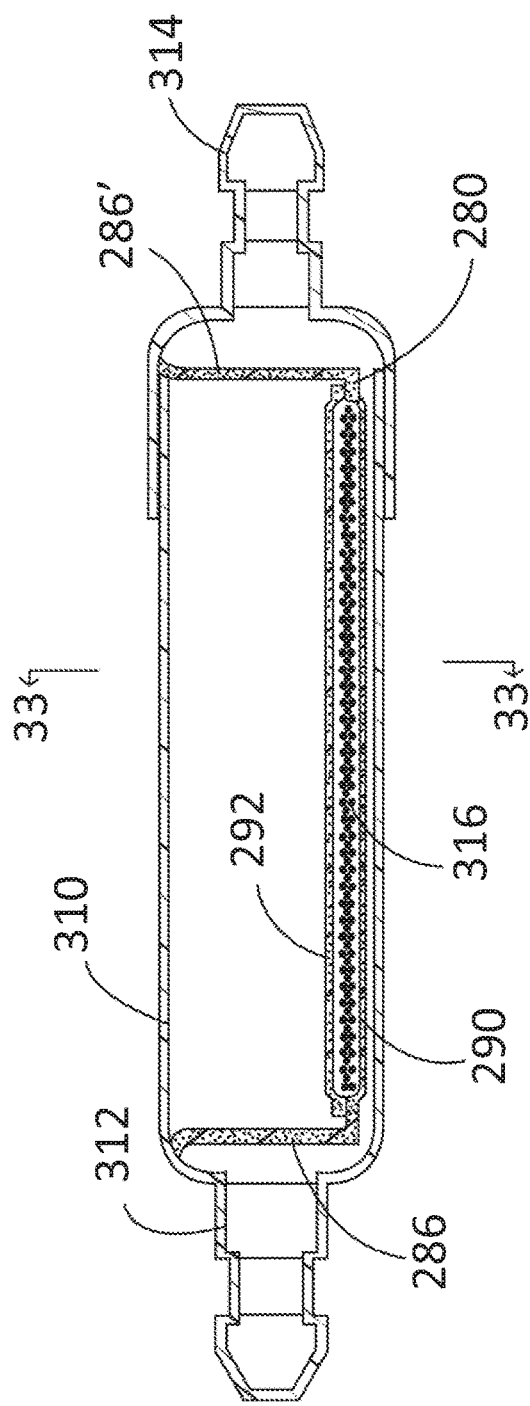
FIG. 32 is a sectional view of the integrated HC trap and air filter of FIG. 29 in position within a housing taken along the long axis of the housing.
Figure 33:
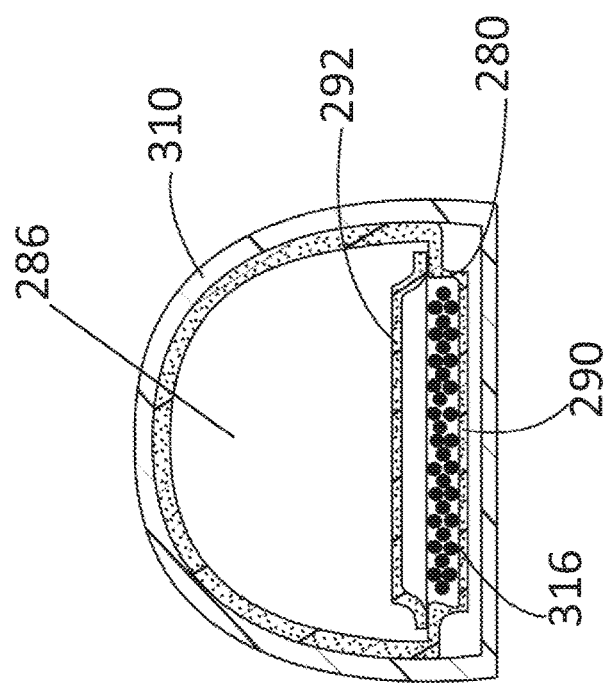
FIG. 33 is a sectional view of the integrated HC trap and air filter of taken along line 33-33 of FIG. 32.

FIGS. 32 and 33 illustrate the integrated hydrocarbon trap and air filter 280 in position within a housing attached to a soundtube. However, it the integrated hydrocarbon trap and air filter 280 may be inserted directly into the soundtube without the provision of a separate housing.

As shown in FIG. 32, a two-piece body 310 is provided that includes a first end 312 and a second end 314. The two-piece housing 310 is formed from a thermoplastic polymer. Non-limiting examples of the preferred thermoplastic polymer suitable for use in forming the two-piece body 310 of the integrated hydrocarbon trap and air filter 280 include polyethylene, polypropylene or nylon or a polyolefin-based polymer, a polystyrene-based polymer, a polycarbonate polymer, or mixture thereof. Hydrocarbon trapping media 316 is placed in the recessed area 288. FIG. 33 illustrates the two-piece body 310 and the integrated hydrocarbon trap and air filter 280 in cross section. This view is taken along lines 33-33 of FIG. 32.

As shown in FIG. 32, the upturned ends 286 and 286' are shown as being slightly angled as they are in contact with the inner surface of the two-piece body 310. The edges of the upturned ends 286 and 286' are preferably attached to the inner surface by, for example, adhesives, press fitting, mechanical fastening, interference fitting, snap fitting, heat staking and welding.

A number of methods may be undertaken for assembling the integrated hydrocarbon trap and air filter. In general and in no particular order of assembly, the air filter foam elements are inserted into the ends of the trap body. The hydrocarbon trapping media is then inserted. The trap body is then assembled. The air filter foam elements as well as the hydrocarbon trapping media may be attached to the body by mechanical attachment or by an adhesive. The assembled integrated hydrocarbon trap and air filter is then attached to the soundtube.

When the hydrocarbon-adsorbing component of the present invention is used in an air intake system, hydrocarbons are removed from the air intake when the vehicle's engine is off. The additional purpose is to allow acoustic tuning. The integrated hydrocarbon trap and air filter of the disclosed inventive concept provides several advantages over known technology. For example, and without limitation, the trap and air filter utilizes common conduit housing to assemble the hydrocarbon trap media, air filter media, and the soundtube. It provides a common inline hose attachment feature for all three of the HC trap media, the air filter media and the soundtube. The trap and air filter eliminates the conventionally-provided hydrocarbon trap heat stake attachment by providing the hydrocarbon trap media within the housing. In addition, the system disclosed herein eliminates the conventionally—provided air filter compression attachment by integrating air filtration within the housing. The disclosed system reduces airflow restriction by providing a secondary air inlet pickup location. The system is made with a minimum number of components while being lightweight and easy to manufacture and assemble.

The hydrocarbon trap and air filter assembly provides an integrated system that provides three previously-separate functions—soundtube, air filter and hydrocarbon trap—in one common package. Because of its integrated design, the hydrocarbon trap and air filter assembly of the disclosed inventive concept provides a high degree of tunability for the evaporative emissions barrier level, NVH, dampening and air filtration. Such tunability is enabled by the provision of modifiable hydrocarbon trap and air filter dimensions, density, material type and amount, and hydrocarbon trap material cross-sectional coverage (full or partial). Accordingly, optimum NVH tuning and dampening is customizable according to vehicle and engine package.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. An integrated hydrocarbon trap and air filter assembly for use with an engine air intake system, the assembly comprising:
a trap including air filter media and hydrocarbon-adsorbing media, said trap having first and second ends, said trap having a long axis;
a tunable soundtube comprising a first tube having a long axis and a second tube having a long axis, said long axis of said trap being axially aligned with said long axis of said first tube and said long axis of said second tube, said first tube having a first end connected to the intake system and a second end connected to said first trap end, said
second tube having ends, one of said ends being connected to said second trap end.

2. The integrated hydrocarbon trap and air filter assembly of claim 1, wherein said end of said second tube connected to said second trap end is a first end and wherein the other end of said second tube is a second end, said second end being open to ambient.

3. The integrated hydrocarbon trap and air filter assembly of claim 1, wherein said air filter media is an open cell reticulated foam.

4. The integrated hydrocarbon trap and air filter assembly of claim 1, wherein said hydrocarbon-adsorbing media is selected from the group consisting of activated charcoal, activated carbon pellets, activated carbon impregnated paper, activated carbon-impregnated non-woven polyester, activated carbon-impregnated foam and zeolite.

5. The integrated hydrocarbon trap and air filter assembly of claim 1, wherein said trap includes a trap body formed between said first and second ends.

6. The integrated hydrocarbon trap and air filter assembly of claim 5, wherein said air filter media comprises a first part and a second part and wherein said hydrocarbon-adsorbing material is positioned between said first and second parts.

7. The integrated hydrocarbon trap and air filter assembly of claim 6, wherein said air filter media further includes a third part positioned between said first part and said second part and over said hydrocarbon-removing material.

8. The integrated hydrocarbon trap and air filter assembly of claim 6, wherein said trap body includes an inner wall and wherein said hydrocarbon-removing material is formed in a sheet substantially against said inner wall thereby forming an air passage therethrough.

9. The integrated hydrocarbon trap and air filter assembly of claim 6, wherein said hydrocarbon-removing material is a pleated sheet of material positioned within said trap body.

10. A system for use with a vehicle having an internal combustion engine and a body, the system comprising:
an air intake attached to the engine;
a component attached to the body;
a trap including air filter media and hydrocarbon-removing media, said trap having first and second ends, said trap having a long axis;
a tunable soundtube comprising a first tube having a long axis and a second tube having a long axis, said long axis of said trap being axially aligned with said long axis of said first tube and said long axis of said second tube, said first tube connecting said first end of said trap and said air intake, said
second tube connecting said second end of said trap and said component.

11. The system for use with a vehicle having an internal combustion engine and a body of claim 10, wherein said second tube includes a first end that is connected to said second end of said trap and a second end that is connected to said component, said second end being open to ambient.

12. The system for use with a vehicle having an internal combustion engine and a body of claim 10, wherein said air filter media is an open cell reticulated foam.

13. The system for use with a vehicle having an internal combustion engine and a body of claim 10, wherein said hydrocarbon-adsorbing media is selected from the group consisting of activated charcoal, activated carbon pellets, activated carbon impregnated paper, activated carbon-impregnated non-woven polyester, activated carbon-impregnated foam and zeolite.

14. The system for use with a vehicle having an internal combustion engine and a body of claim 10, wherein said trap includes a trap body formed between said first and second ends.

15. The system for use with a vehicle having an internal combustion engine and a body of claim 14, wherein said air filter media comprises a first part and a second part and wherein said hydrocarbon-adsorbing material is positioned between said first and second parts.

16. The system for use with a vehicle having an internal combustion engine and a body of claim 15, wherein said air filter media further includes a third part positioned between said first part and said second part and over said hydrocarbon-adsorbing material.

17. The system for use with a vehicle having an internal combustion engine and a body of claim 15, wherein said trap body includes an inner wall and wherein said hydrocarbon-adsorbing material is formed in a layer substantially against said inner wall thereby forming an air passage therethrough.

18. The system for use with a vehicle having an internal combustion engine and a body of claim 15, wherein said hydrocarbon-adsorbing material is a pleated layer of material positioned within said trap body.

19. An integrated hydrocarbon trap and air filter for use with the air intake system of an engine, the system incorporating a tunable soundtube having a long axis, the system comprising:
- a housing having a first end connected to the tunable soundtube of the air intake system, a second end open to ambient and a body between said first and second ends, the housing having a long axis axially aligned with said long axis of said soundtube;
- a first air filter media;
- a second air filter media; and
- a hydrocarbon-adsorbing media positioned between said first air filter media and said second air filter media.

20. The integrated hydrocarbon trap and air filter of claim 19, wherein said air filter media is an open cell reticulated foam and said hydrocarbon-adsorbing media is selected from the group consisting of activated charcoal, activated carbon pellets, activated carbon impregnated paper, activated carbon-impregnated non-woven polyester, activated carbon-impregnated foam and zeolite.

* * * * *